April 20, 1926.

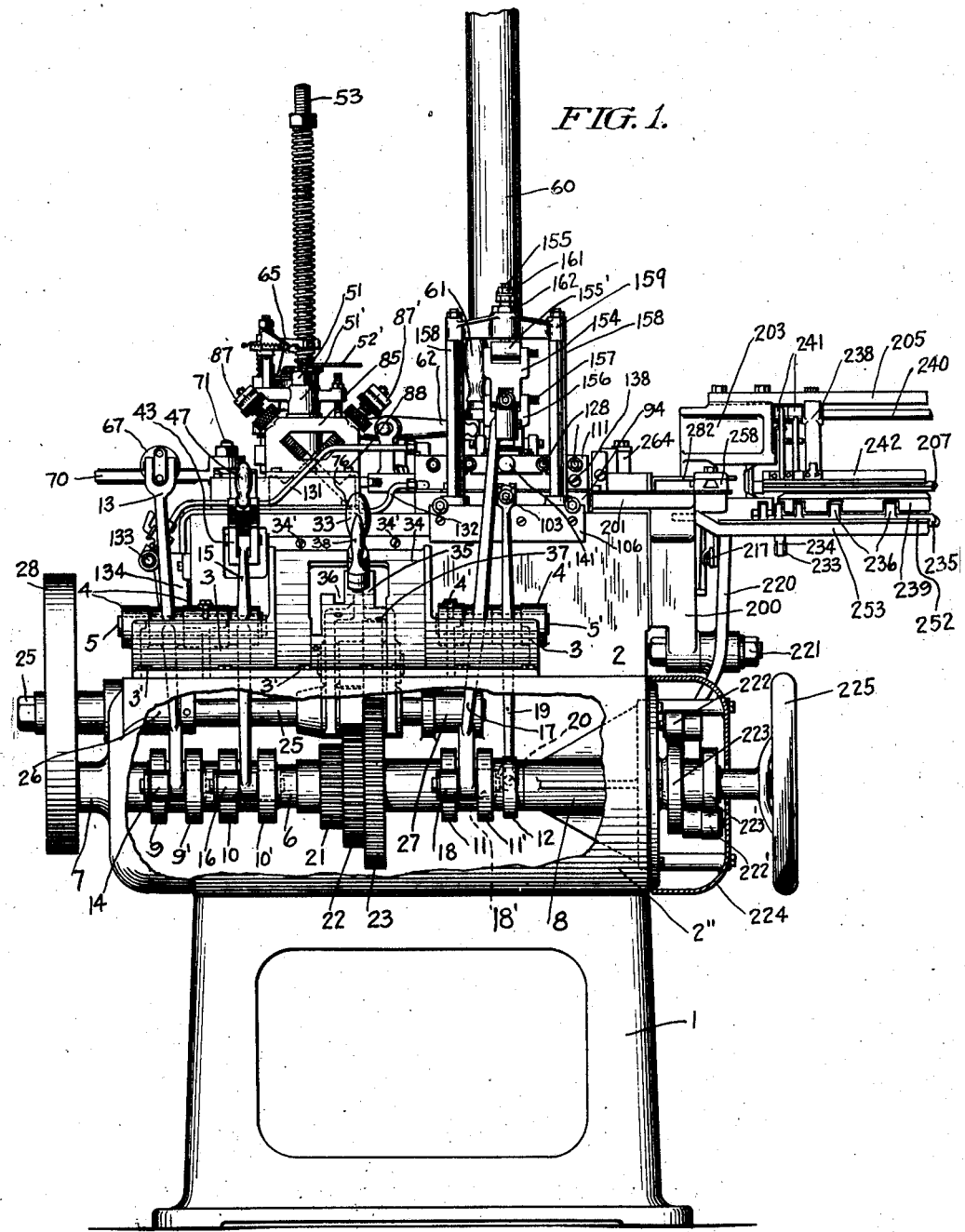

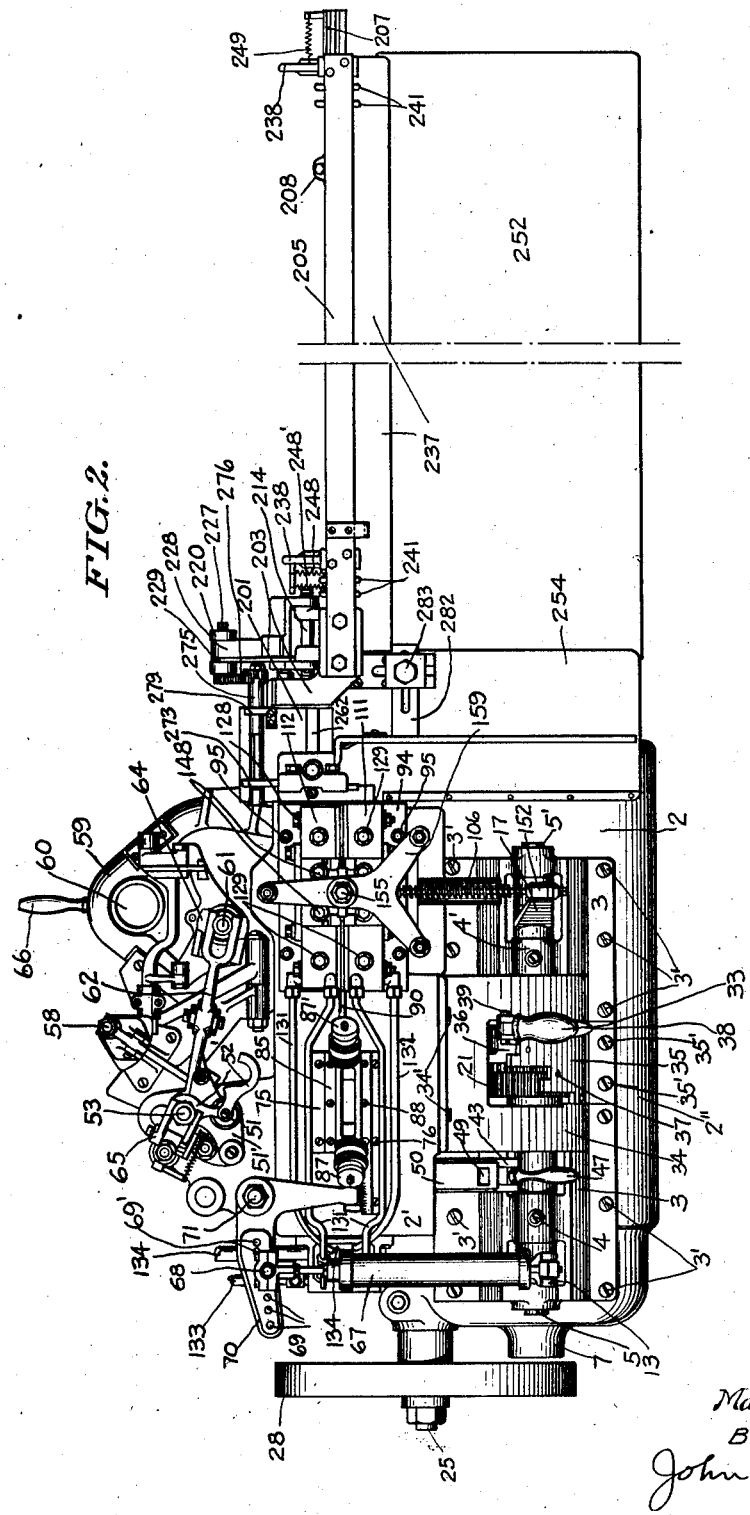

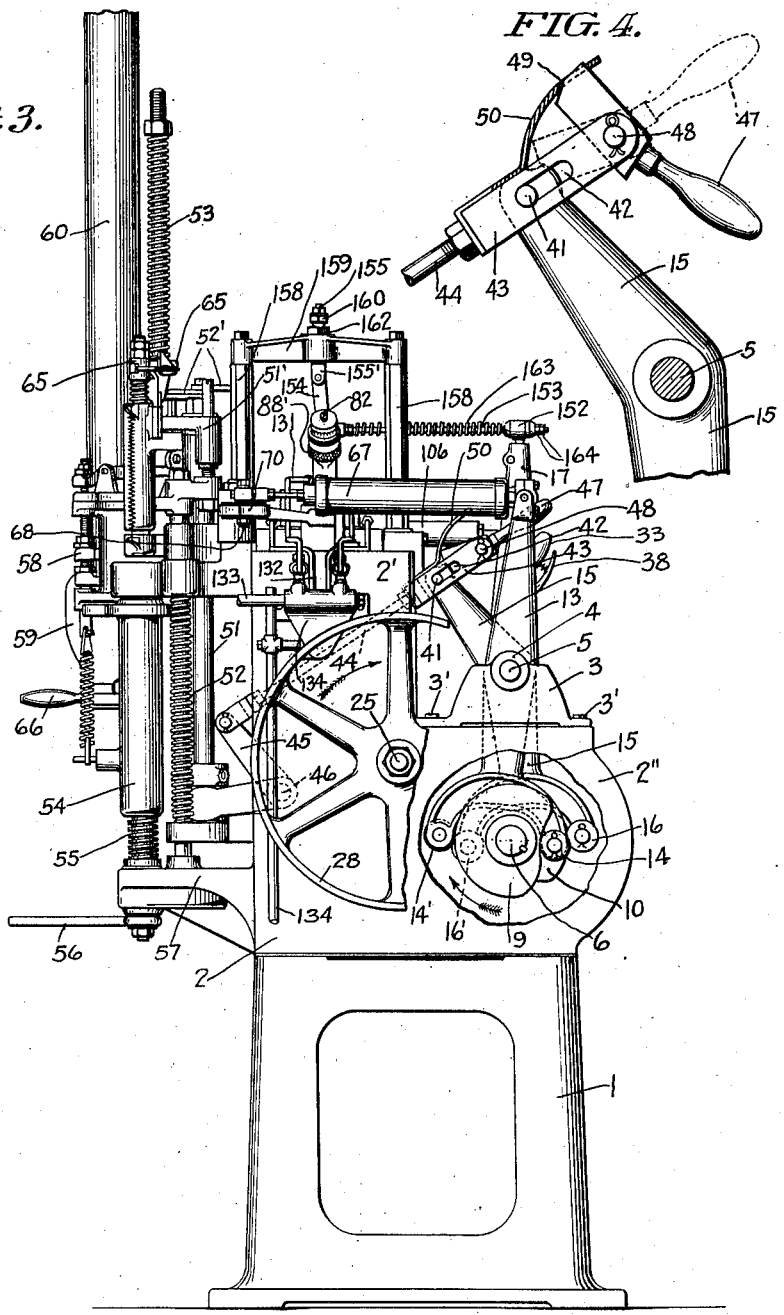

M. C. INDAHL

PRINTERS' MATERIAL MAKING MACHINE

Filed Nov. 30, 1923  12 Sheets-Sheet 4

1,581,125

INVENTOR:
Mauritz C. Indahl,
BY
John A. Ferguson
HIS ATTORNEY.

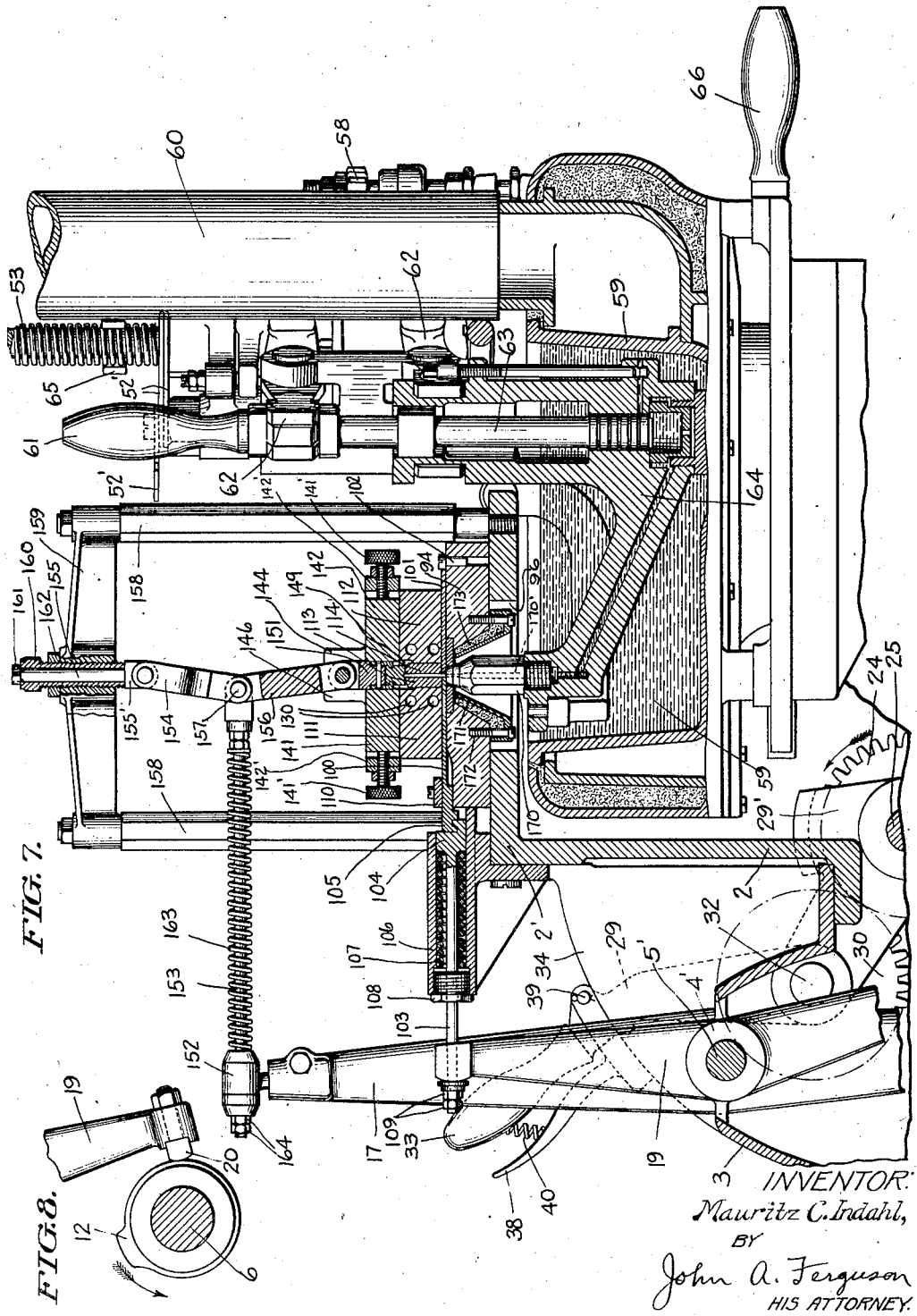

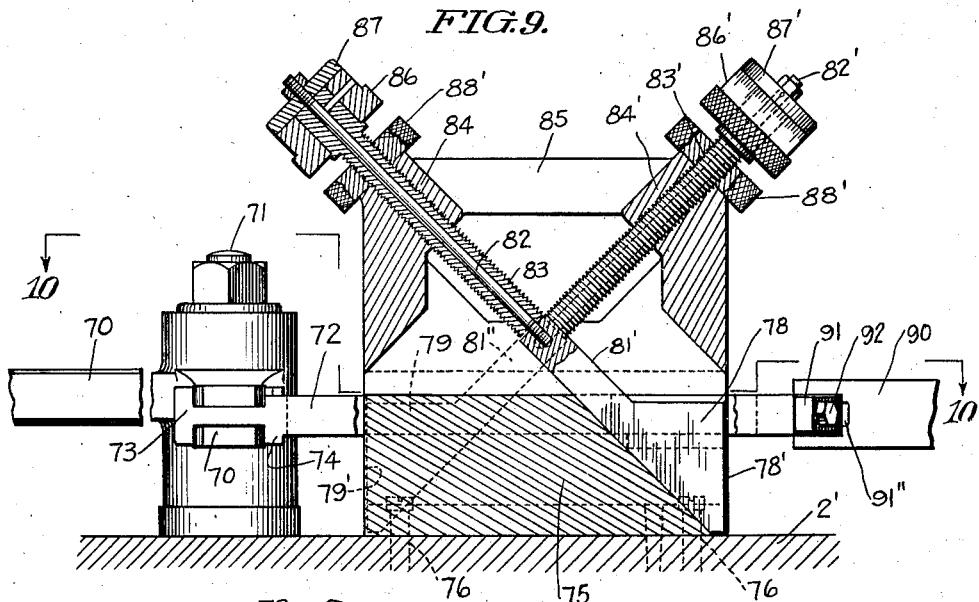
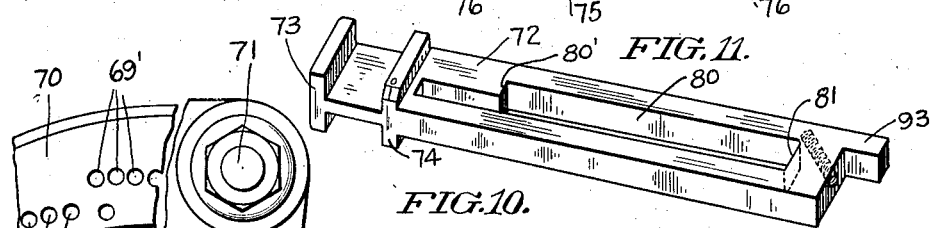
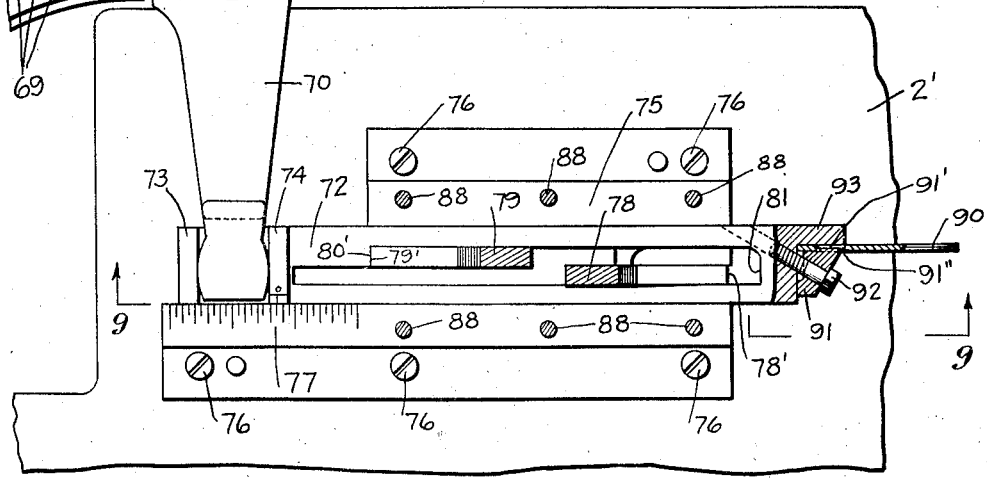

April 20, 1926.
M. C. INDAHL
1,581,125
PRINTERS' MATERIAL MAKING MACHINE
Filed Nov. 30, 1923  12 Sheets-Sheet 7
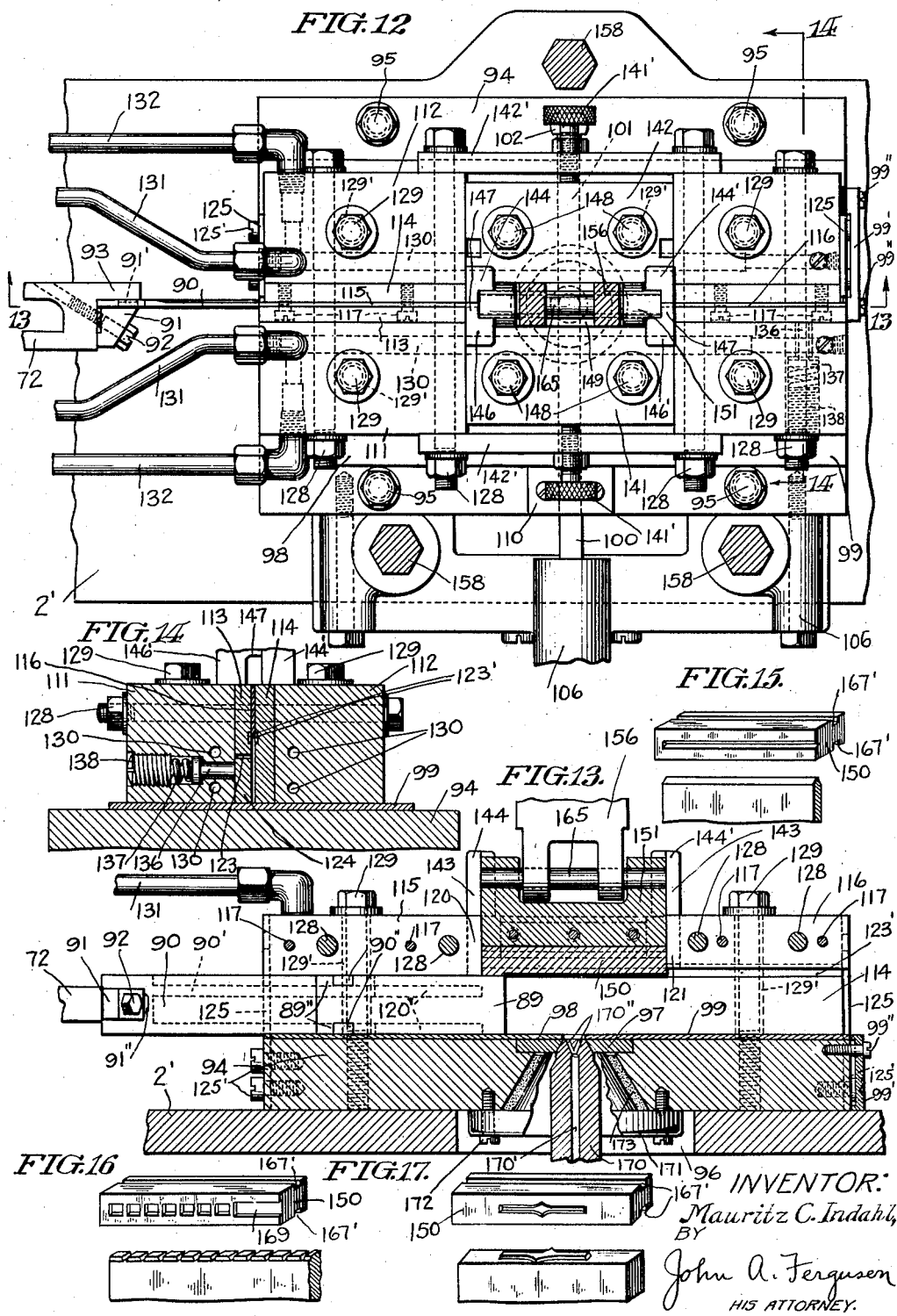
INVENTOR:
Mauritz C. Indahl,
BY
John A. Ferguson
HIS ATTORNEY.

April 20, 1926.
M. C. INDAHL
1,581,125
PRINTERS' MATERIAL MAKING MACHINE
Filed Nov. 30, 1923     12 Sheets-Sheet 8
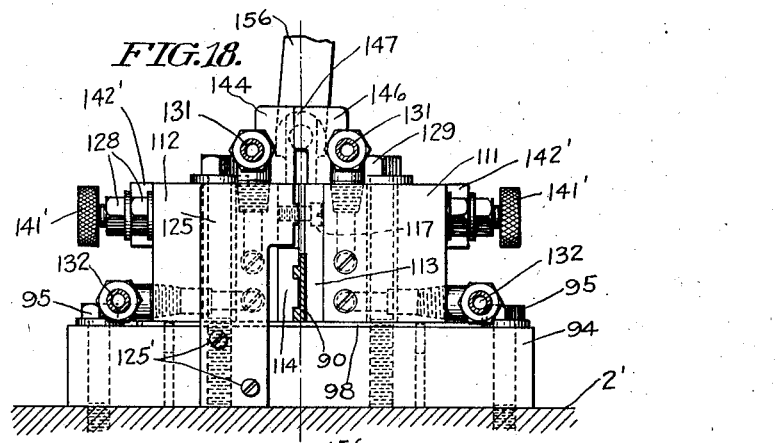
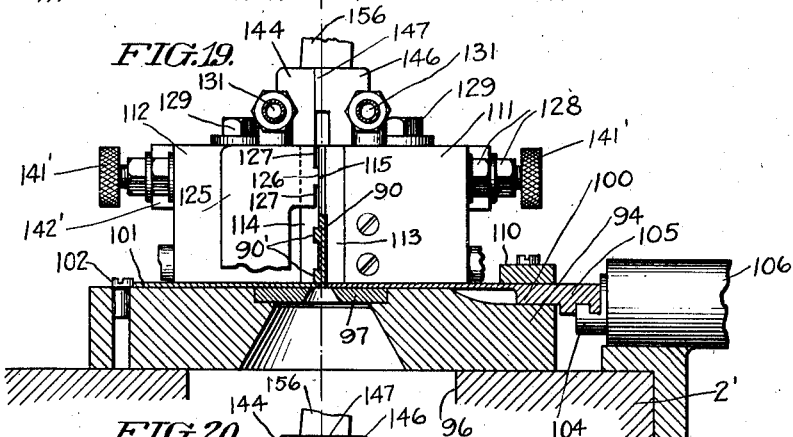
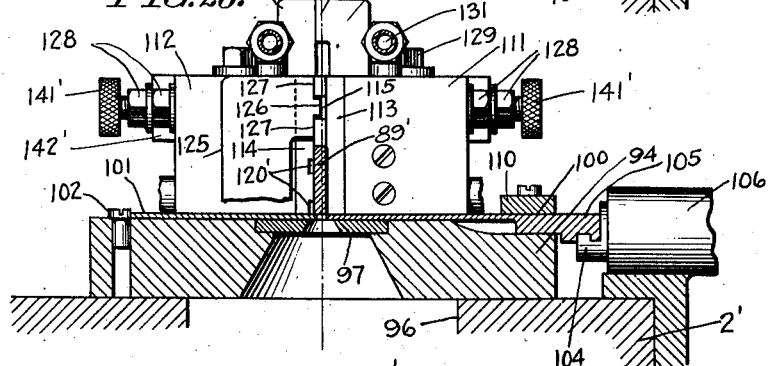
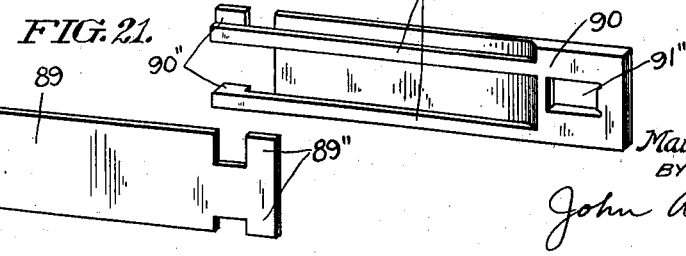
INVENTOR:
Mauritz C. Indahl,
BY
John A. Ferguson
HIS ATTORNEY.

April 20, 1926.
M. C. INDAHL
1,581,125
PRINTERS' MATERIAL MAKING MACHINE
Filed Nov. 30, 1923 12 Sheets-Sheet 9
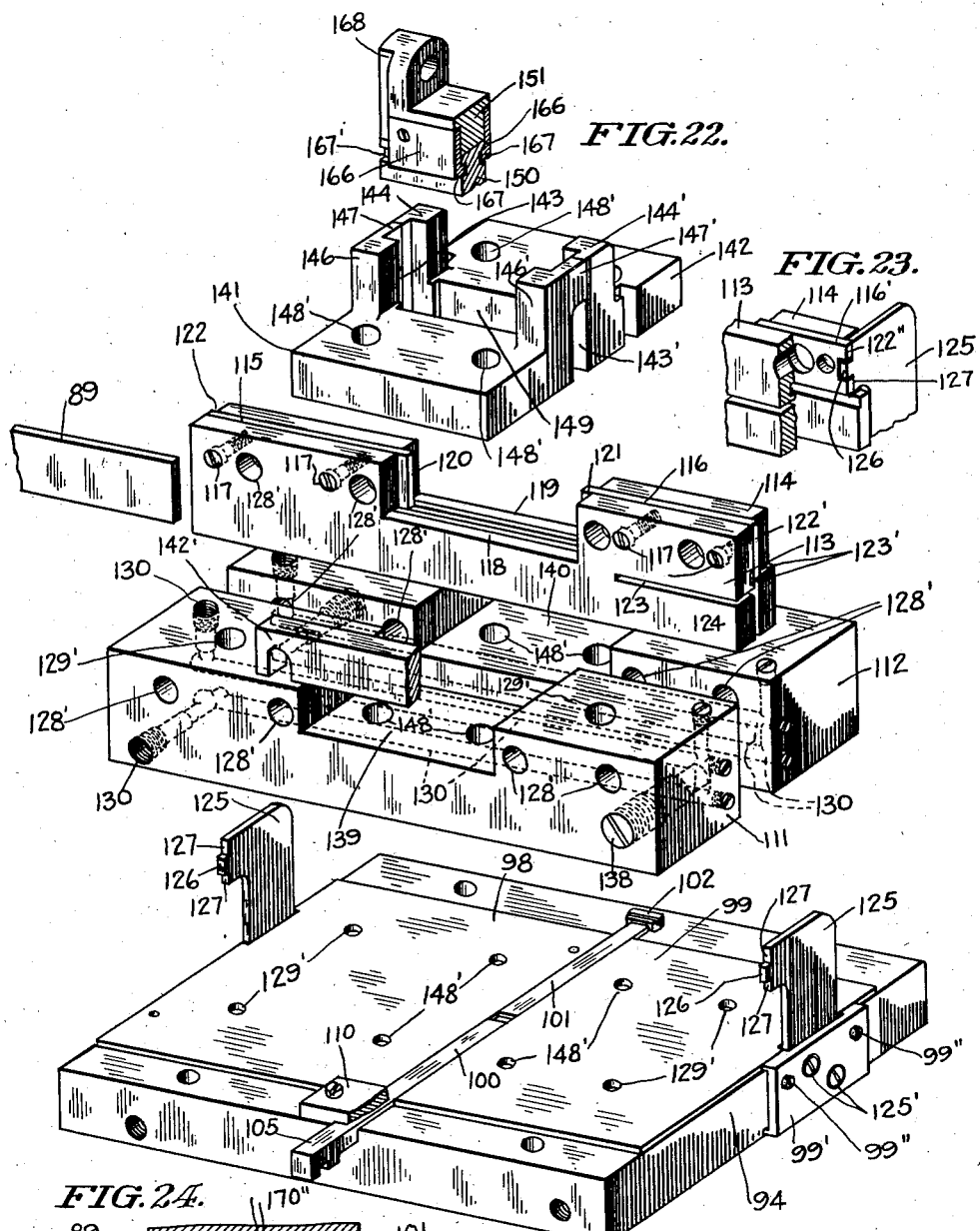
INVENTOR:
Mauritz C. Indahl,
BY
John A. Ferguson
HIS ATTORNEY.

April 20, 1926. 1,581,125
M. C. INDAHL
PRINTERS' MATERIAL MAKING MACHINE
Filed Nov. 30, 1923 12 Sheets-Sheet 10

INVENTOR.
Mauritz C. Indahl,
BY
John A. Ferguson
HIS ATTORNEY.

April 20, 1926.

M. C. INDAHL 1,581,125

PRINTERS' MATERIAL MAKING MACHINE

Filed Nov. 30, 1923  12 Sheets-Sheet 11

INVENTOR:
Mauritz C Indahl,
BY
John A. Ferguson
HIS ATTORNEY.

April 20, 1926.

M. C. INDAHL 1,581,125

PRINTERS' MATERIAL MAKING MACHINE

Filed Nov. 30, 1923   12 Sheets-Sheet 12

INVENTOR:
Mauritz C. Indahl,
BY
John A. Ferguson
HIS ATTORNEY.

Patented Apr. 20, 1926.

1,581,125

UNITED STATES PATENT OFFICE.

MAURITZ C. INDAHL, OF PHILADELPHIA, PENNSYLVANIA, ASSIGNOR TO LANSTON MONOTYPE MACHINE COMPANY, OF PHILADELPHIA, PENNSYLVANIA, A CORPORATION OF VIRGINIA.

PRINTER'S MATERIAL-MAKING MACHINE.

Application filed November 30, 1923. Serial No. 677,712.

*To all whom it may concern:*

Be it known that I, MAURITZ C. INDAHL, a citizen of the United States, and a resident of Philadelphia, county of Philadelphia, State of Pennsylvania, have invented certain new and useful Improvements in Printers' Material-Making Machines; and I do hereby declare the following to be a full, clear, and exact description of the same, reference being had to the accompanying drawings, forming part of this specification, and to the characters of reference marked thereon.

This invention relates to typographic casting machines for producing and handling material used in printing forms, such as types, leads, slugs, rules, fancy borders and the like. More particularly the invention relates to the casting of fused or non-fused strip material, this material being low so as not to print but either to provide white space in printed matter, or to form a base for printing plates, or being type high so as to print rules, borders, dashes, type lines and the like. A machine for producing strip material of this kind is well-known as the product of Lanston Monotype Machine Company, the basic features of this machine being disclosed in United States Letters Patent No. 1,222,415, dated April 10, 1917, in which the fusion principle is described while the non-fusion principle is particularly set forth in United States Letters Patent No. 1,257,006, dated February 19, 1918.

The principal object of the present invention is to produce a machine for casting material for printers' forms, particularly strip material, such as referred to, by the fusion process or non-fused types or strips, such machine being not only of simplified construction and low manufacturing cost, but also of enlarged scope and improved with regard to the excellence and variety of product produced as well as to the quantity made during a given time.

Among other objects may be mentioned the production of a typographic machine capable of adjustment at will for a fused or a non-fused product; a combination of such machine with a plurality of cutter or stacker mechanisms each adapted particularly to the kind of product being made, each of novel structure and the non-fusion cutter being related to and combined with the machine in a novel manner; a mold provided with a mold unit which is readily removable and changeable; a mold provided with a closure member whereby the inlet port of the mold may be closed off while the casting metal is still molten and, if desired, before the pressure from the injection has been reduced or removed; a mold unit of novel and simplified construction; a nozzle provided with a plurality of discharge passages to insure long-stroke strip production; other objects of the invention will be hereinafter pointed out or will otherwise appear in connection with the following description of the embodiment of the invention illustrated in the accompanying drawings in which:

Fig. 1 is a front elevation of the machine parts being broken away.

Fig. 2 is a plan view of the machine the gear shift handle being in a different position from that shown in Fig. 1.

Fig. 3 is an end elevation thereof, parts being broken away.

Fig. 4 is a detail view showing the operation of the pump control lever.

Fig. 7 is a vertical section through the pump and mold.

Fig. 8 is a detail of a portion of the closure member lever and cam.

Fig. 9 is a longitudinal vertical section through the micrometer stop device on substantially line 9—9 of Fig. 10.

Fig. 10 is a horizontal section on substantially line 10—10 of Fig. 9.

Fig. 11 is a perspective view of the mold blade carrier.

Fig. 12 is a plan view of the mold.

Fig. 13 is a vertical section through the mold on substantially line 13—13 of Fig. 12.

Fig. 14 is a detail sectional view on substantially line 14—14 of Fig. 12.

Fig. 15 is a perspective view of a straight line rule matrix and a portion of the product therefrom.

Fig. 16 is a perspective view of a fancy border matrix and a portion of the product therefrom.

Fig. 17 is a perspective view of a dash matrix and a portion of the product therefrom.

Fig. 18 is an end elevation of the mold, looking from the mold blade end thereof.

Fig. 19 is partly a section through the metal entrance port and partly an end elevation of the mold.

Fig. 20 is a view similar to that of Fig. 19, but showing a mold unit for producing material of a different point size.

Fig. 21 illustrates in perspective a thin-material mold blade and an extension therefor.

Fig. 22 shows perspective views of various parts of the mold in separated relation.

Fig. 23 is a detail showing the positioning of a mold unit of different point size from that shown in Fig. 22.

Fig. 24 is a diagrammatic view in section illustrating the action of the two-hole nozzle in producing fused strip material.

Figure 5:
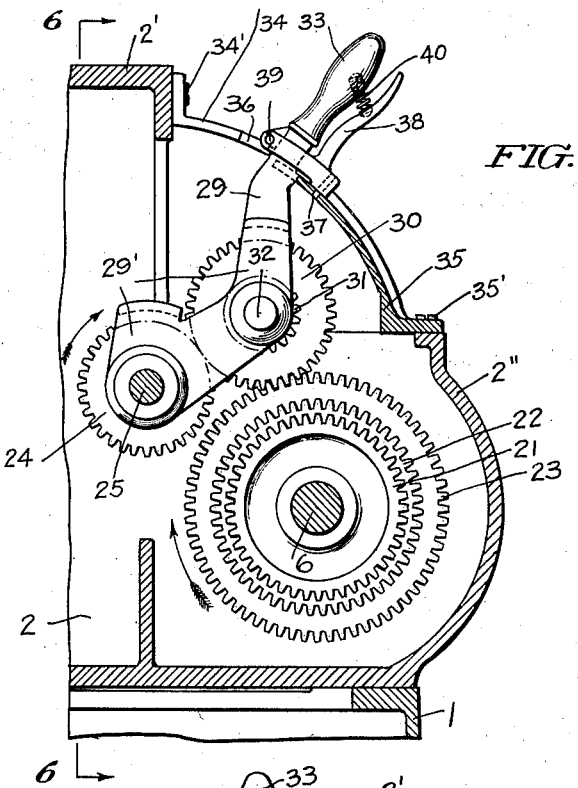
Fig. 5 is a cross section showing the speed changing mechanism.

The machine illustrated has a supporting base 1 upon which is mounted a main stand or casting 2 (see Figs. 1, 2 and 3) for supporting the various mechanisms of the machine. This main stand is stepped, the upper step 2′ being toward the rear and supporting thereon particularly the mold and the mold control mechanism, and a lower step portion 2″. Upon the lower step a bearing bracket 3 is mounted by screws 3′, this bracket being formed into bosses 4 and 4′ for supporting the cam lever shafts 5 and 5′ respectively. Below the bearing bracket 3 is the cam shaft 6 of the machine supported in end bearings 7 and 8 and provided with a pair of cams 9, 9′ for the mold blade operating mechanism, a pair of cams 10, 10′ for the pump mechanism, a pair of cams 11, 11′ for the matrix operating mechanism and a single cam 12 for controlling the operation of the mold closure member.

The mold blade operating cam lever 13 is pivoted intermediate its ends on the shaft 5 of the bearing bracket 3 and its lower end is forked, the ends of the fork being provided with cam rollers 14, 14′ to engage with the cams 9, 9′ respectively. The upper end of the lever 13 extends to a point above the upper stepped portion 2′ of the main stand 2 and is connected with the mold blade operating mechanism. The pump cam lever 15 is pivoted also on the shaft 5 and has a forked lower end provided with rollers 16, 16′ to engage with the pair of cams 10, 10′ respectively. The matrix operating cam lever 17 is pivoted intermediate its ends on the shaft 5′ and has a forked lower end provided with cam rollers 18, 18′ for engagement with the pair of cams 11, 11′ respectively. One cam of each pair is adapted to drive its lever in one direction and the other cam to drive it in the opposite direction. The mold closure member cam lever 19 is likewise pivoted on the shaft 5′ and has its lower end provided with a wearing plate 20 to co-act with the cam 12 (see Fig. 8).

Figure 6:
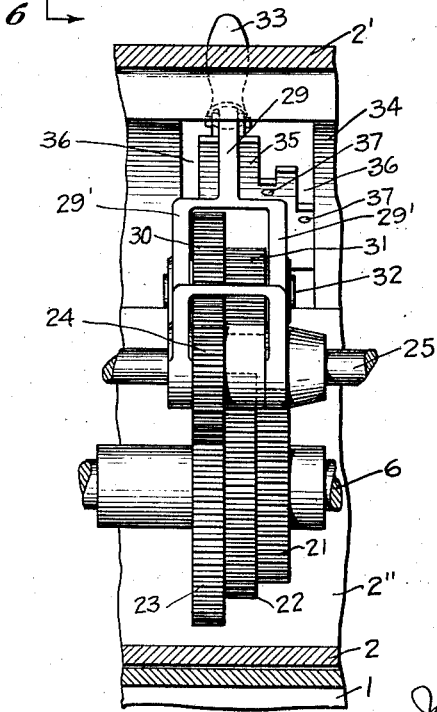
Fig. 6 is a longitudinal section substantially on line 6—6 of Fig. 5, and showing the speed changng mechanism.

The cam shaft 6 is provided between the levers 13 and 15 on one side and the levers 17 and 19 on the other side with spur gears 21, 22 and 23 of varying diameter, which gears are keyed to shaft 6 and adapted to be driven by the gear 24 on the driving shaft 25 journalled in bearings 26 and 27 formed within the hollow interior of the main stand 2. Outside of the main stand 2 the shaft 25 is provided with a pulley 28 which may be driven from a source of power in any desired manner. The gear 24 is keyed to but slidable upon the shaft 25 within the forked portion 29′ of the speed-change lever 29 (see Figs. 5 and 6). The shaft 25 extends through the forks 29′ and the lever 29 is slidable and rotatable on the shaft. The gears 30 and 31 are pivoted between the forks 29′ on the shaft 32 secured to said forks above the shaft 25, the gear 30 being always in mesh with the gear 24 and the gear 31 being of smaller diameter than the gear 30 and secured to the latter so as to be driven by it. The outer end of the lever 29 is provided with an operating handle 33 located above the step 2″ so as to be readily grasped by the operator to rotate the lever 29 on and slide it along the shaft 25 for the purpose of engaging or disengaging the gear 30 with any of the gears 21, 22, 23, on the cam shaft and for engaging or disengaging the gear 31 with the gear 23. A guide plate or casing for the lever 29 is provided, the frame portion 34 of which may be, as shown, integral with the bearing bracket 3, and the portion 35 of which may be a separate plate; this casing portion 34 extends on an arc from the step 2" to the portion 2' of the stand 2 and is secured to the portion 2' by screws 34', while the plate 35 is secured to the stand portion 2" by screws 35'. Slots 36 are provided in this guide member so that when the handle 33 is moved upwardly on the pivot 25, it may then be moved laterally together with its gears and the main driving gear 24 to any one of four positions represented by the slots, so that when allowed to drop downwardly and forwardly, the lever 29 will enter and be guided by these slots, the latter being so positioned that they ensure the proper meshing of the gear wheels to obtain in an obvious manner various speeds for the cam shaft. The guide plate is provided below each slot with a hole 37 into which may extend a locking pin of the handle lock 38 pivoted to the handle at 39, and normally spring pressed away from the handle by the spring 40. These holes 37 are provided each for a definite gear meshing, and consequently lock the lever 29 in position to ensure definite cam shaft speeds. It will be seen that even while the machine is in operation the handle 33 may be moved upwardly and laterally and then downwardly to provide a meshing of gears to produce any one of the four speeds of which the mechanism shown is capable.

The cam lever 15, previously mentioned, for operating the pump extends upwardly from the shaft 5 in an angular direction and near its upper end is provided with a laterally extending pin 41 adapted to operate in slots 42 in the connecting head 43, which latter is connected by a rod 44 extending downwardly and rearwardly through windows in the stepped portion 2' of the main stand 2 and connected at its lower end with the pump bell crank lever 45, pivoted at 46 in bearings provided in the main stand 2. The connecting head 43 is in the form of two side plates slotted at 42 and having a pump control lever 47 pivoted between the plates at 48, the outer end of which lever is formed into a handle and the inner end of which extends between the side plates to engage, as shown in Fig. 3, and in dotted lines in Fig. 4, with the cam lever 15 and hold its pin 41 at one end of the slots 42. In this position the effect is to bind together the cam lever 15 and the connecting head 43 so as to cause the former to move the connecting head, the rod 44 and the pump bell crank 45 and thus cause operation of the pump. When the handle 47 is moved downward, as shown in Fig. 4, its inner end snaps into a hole 49 in a leaf spring 50 secured to the connecting head; thus the pin 41 may slide idly in the slots 42 and the pump is out of operation. The spring 50 and hole 49 secure the handle 47 in inoperative position, while the wedging of the inner end of the control lever 47 against the upper end of cam lever 15, particularly under pressure of the leaf spring 50 secures the control handle in operative position. It will be seen that the pump control is simple and positive, as well as handy.

The pump mechanism, the pump operating mechanism, the melting pot and heating means therefor, as well as other related constructions, may be generally similar to the well-known mechanism of the type casting machine as manufactured by Lanston Monotype Machine Company. It is not deemed necessary to describe this mechanism in detail therefore, but reference may be made to United States Letters Patent No. 1,222,415, previously mentioned, or to Letters Patent Reissue No. 12,819, dated June 23, 1908, and to other patents referred to therein, wherein this mechanism is basically disclosed; and in addition certain of the parts shown in the drawings will be referred to for identification purposes merely, for example, (see Figs. 2, 3 and 7) the piston lever operating rod 51, its cross head 51', the pump body spring rod 52, the piston spring rod 53 with its spring, the swing frame 54, the swing frame screw 55, operated by a ratchet handle 56 instead of by the usual crank handle and supported on the bracket 57 formed on the rear wall of the main stand 2, the pump body operating device 58, the melting pot 59, the chimney 60, the pump piston handle 61, the piston lever 62, the piston 63, the pump body 64, the latch device 65, the melting pot handle 66, by which the pot may be swung on the axis of screw 55 as a pivot.

The main stand 2 is hollowed out, as shown in Fig. 7, to permit the nozzle to be swung under the mold, after which the ratchet 56 may be manipulated to raise the pot, guided in the usual manner, to bring the nozzle against the nozzle seat of the mold.

In the patented machine the piston lever operating rod 51 is moved upwardly by the bell crank 45, thus compressing the spring 53 until the latch is tripped by contact of the cross head 51' with the free arm of the latch: the tripping of the latch causes the operation of the pump piston 63 in a well-known manner. In the present construction, it has been found desirable to pivot a plurality of thin plates 52' on the top of the rod 51 so that one or more of said plates may be swung between the cross head 51' and the free arm of the latch 65. This alters the timing of the pump operation, it being obvious that as more plates 52' are swung into action the more quickly the pump will be actuated. At high speeds it has been found desirable thus to advance the actuation of the pump so that it will be properly timed in relation to the closure slide, to be referred to hereinafter. This time relation is a delicate one and the provision of a timing device, such as that embodied in the plates 52', has been found to be advantageous.

The mold blade operating cam lever 13 is connected at its upper end by a suitable ball-and-socket joint to the casing of the spring box 67, the inner member of which is connected preferably by a similar joint to the bolt 68 passing through one of two series of holes 69 and 69' in the power arm of the bell crank lever 70 (Fig. 10) pivoted at 71 to the top of the upper step 2' of the main stand 2 and having its work arm connected to the mold blade carrier 72 which in turn is connected to the mold blade. The spring box 67 may be of any suitable construction preferably yielding in both directions so that if the mold blade is held up or obstructed either during its forward, ejecting stroke, or during its rearward, mold dimensioning stroke, the springs in the spring box will absorb the motion of the cam lever 13, thus preventing breakage of any part of the mechanism.

The forward end of the mold blade commonly acts to dimension the mold cavity in typographic machines, the dimensioning being measured from a definite, basic position of this end of the blade, which position is frequently that assumed when the mold blade is at the forward end of its stroke, the dimension of the mold cavity determined by the blade being the distance the blade is withdrawn from that forward position. If a greater dimension is desired the blade is withdrawn a greater distance. This variation in dimension is accomplished in the mechanism shown by the provision of a series of holes in the bell crank 70, this series being in the form of an arc, the radius of which is the length of the spring box 67 when the mold blade is in its basic position previously referred to. It will be seen that, with this construction, any hole of the series may be used without influencing the basic position of the mold blade which may thus be regarded as a constant, although the distance of withdrawal from that position, or the stroke of the blade, will be increased or diminished according as the holes used are nearer or further from the pivot 71 of the bell crank 70. The machine illustrated is adapted to produce either fusion or non-fusion elements of a printing form, as hereinbefore stated. For fusion the mold blade has its basic or constant position with its forward end slightly beyond the nozzle opening, as will be clearly understood by those skilled in the art. The series of holes 69 are provided in the bell crank in approximately the form of an arc drawn when the mold blade is in such basic position; all the holes 69 will therefore produce fused increments although each hole will produce a definite mold blade stroke different from that of the other holes in the series and thus provision is made for a variety of increment lengths. Likewise, for non-fused elements the forward end of the mold blade should advance some distance beyond the nozzle opening, the basic position or constant being thus different from that for fusion: the arcuate series of holes 69' is therefore provided similarly to the holes 69 to produce various lengths of non-fused product. It will be understood that the operator will insert the bolt 68 through the proper hole 69, or 69', and secure it there in order to obtain the desired stroke for fusion or non-fusion production. It is obvious that since the machine is capable of producing product of various point sizes, it is of great advantage to have a variety of stroke lengths in order to attain the best results under any given condition.

The end of the work arm of the bell crank 70 is shaped, as shown particularly in Fig. 10, to co-operate with the shoulders 73 and 74 of the mold blade carrier 72 so as to reciprocate the latter in its guide block 75 secured to the step 2' of the main stand 2 by screws 76. This block is provided with a pica or other scale 77 with which the zero mark on the shoulder 74 co-operates so that the length of stroke of the carrier may be indicated. The block 75 is provided with a front, vertical slot, the rear wall of which rises at an angle of 45°, as shown, for guiding the sloping rear face of the rear micrometer stop 78 and with a rear, vertical slot slightly out of line with the other slot, this rear slot being provided for guiding the sloping forward face of the forward micrometer stop 79. These stops extend through a slot 80 in the mold blade carrier (Fig. 11), the shoulder 80' of the latter coming against the rear vertical face 79' of the stop 79 to stop the carrier in its forward motion and the shoulder 81 of the carrier acting against the forward vertical face 78' of the stop 78 to arrest movement of the carrier in a rearward direction. The blow in either case is taken up by the angular faces of the slots in the block 75.

For adjusting the stops they are moved by micrometer screws, each in a direction parallel to its 45° face. The stop 78 has a portion 81' extended in this direction, to the end of which, and extending in the same direction, is screwed a rod 82. Surrounding the rod 82 is a screwthreaded sleeve 83, the end of which abuts the end of the extension 81' and the threads of which work in a boss 84 formed in the cap piece 85. The sleeve 83 is provided with a milled head 86 provided with a scale to co-operate with a zero point on the button 87 rigidly secured to the rod 82 at its upper end. The stop 79 likewise has a portion 81″ to which is secured a rod 82′ surrounded by a sleeve 83′ provided with a head 86′ and screwthreaded in the boss 84′, the rod 82′ being provided with a button 87′. The two micrometer screws extend at right angles to each other crossing just above the carrier 72, and are held by the cap 85 which is secured to the block 75 by screws 88, and is hollowed out suitably to allow for any adjustment of the stops 78 and 79: the slot 80 in the carrier 72 is also extended to accommodate any position of the stops.

In operating the stops the milled head 86 or 86′ is turned, thus advancing the screw sleeve 83 or 83′ to push against the stop extension 81′ or 81″ and thus move the stop 78 or 79 downwardly, its angle face sliding upon the angle face of the slot in the block 75; or if the head is turned in an opposite direction it will push the button 87 or 87′ upwardly and with it the rod 82 or 82′, the latter pulling the stop 78 or 79 up the angle slope. Lock nuts 88′ may be used to lock the sleeves in adjusted position. The movement of the stop 78 or 79 thus displaces the stop face 78′ or 79′ in the direction of movement of the carrier 72 and determines the extent of movement thereof. While the arcuate series of holes 69 and 69′, or their equivalent in the form of slots, determines the mold blade carrier stroke, the micrometer stops 78 and 79 are preferably embodied in the machine structure in order to produce readily fine adjustments such as are necessary in the practical operation of the machine: it is possible to employ only the arcuate holes or only these stops, but the use of the stops with the addition of the arcuate holes in the operating mechanism is desirable to obtain fine adjustments and to prevent undue spring compression in the spring box 67, a definite but small amount of spring compression under all circumstances being the most desirable operating condition.

The stroke of the carrier 72 is also that of the mold blade, because the latter is secured to the carrier, either directly as in the case of a large point size blade 89′ such as indicated in cross section in Fig. 20, or indirectly through the intermediary of the mold blade extension 90, as shown in the other figures, the mold blade being indicated by the character 89. The extension may be employed when the mold blade is thin, in which case, as shown in Fig. 21, the blade is short and is formed with a T-head 89″ to co-operate in an obvious manner with the complementary shaped end 90″ of the extension. For strength the blade or its extension 90 is provided with longitudinal ribs 90′ which run in grooves in the mold cheek-piece to be described hereinafter. The blade or its extension is secured to the mold blade carrier by means of the angle block 91 and screw 92 shown best in Figs. 10 and 12. The lugs 91′ on the block co-operate with the lug 93 of the carrier and with the aperture 91″ in the mold blade (Fig. 21) in an obvious manner.

The mold is provided with a base plate, the main member 94 of which is secured to the step 2′ of the main stand 2 by screws 95 (Fig. 12), its lower face being provided with a conical hole for the passage of the pump nozzle, this hole being in effect a continuation of the large circular hole 96 in the step 2′ (Fig. 13). At the upper end of the conical hole is the circular nozzle plate 97 sunk into the upper face of the base plate member 94 so that the upper face of the nozzle plate corresponds with the upper surface of the member 94. The nozzle plate is provided with a conical hole extending through its center, this hole constituting a nozzle seat against which the nozzle is raised for casting after which it is again lowered in a well understood manner. To complete the base plate structure there are located in any suitable manner, as by dowels, on the top of the base plate member 94 two relatively thin lining plates 98 and 99 (Fig. 22), these plates being spaced apart crosswise of the base member 94 in the vicinity of the nozzle opening to provide guides for the mold closure member or slide 100 and its abutment piece 101, the parts 100 and 101 being of the same thickness as the lining plates 98 and 99: the latter are essentially a part of the plate 94 but are made separate for ease of manufacture and repair as well as for convenience in producing a hardened steel wearing surface upon the plate 94 which latter may be of cast iron. The abutment 101 is positioned with its inner end in close proximity to the nozzle opening so that a stream of metal injected through the nozzle will just clear the end of the abutment. With molds of larger point size the clearance is of course greater than with those of smaller point size and two clearance positions are provided; they are determined by the pin 102 having opposite stop faces at different distances from the axis of the pin; by sliding the abutment over the nozzle and then turning the pin 102 as by a screw driver either one of the two stop faces may be presented to the rear end of the abutment, after which the abuement may be slid back against the chosen face of the pin 102. The member 100 is slidable away from and against the abutment so as to open and close the port through which the stream of molten metal is injected through the nozzle into the mold cavity, this port being formed at the upper end of the conical nozzle seat in the plate 97. The abutment piece 101 may be clamped tightly between the plates 98 and 99, serving as a point block, in which case the dowels in one plate may be omitted.

This clamping may be effected by screwing against the edge of plate 99 a shoe 99' secured by screws 99'' to the mold base 94. The slide 100 is fitted with a slight clearance so as to slide easily under operating conditions.

The operation of the closure member 100 occurs with each casting and is accomplished by the cam 12, and cam lever 19 previously referred to. The lever 19 is forked at its upper end which is in the horizontal plane of the closure 100 and moves in the direction of movement of the latter (Fig. 7). Within the forks of this lever is positioned a rod 103 the rear end of which is hooked at 104 to co-operate with the hooked forward end 105 of member 100. The hooked end 104 is guided in the hollow portion of a bracket 106 secured to the stand portion 2', the rod extending through this hollow portion and being surrounded by a compression spring 107 which, when the lever 19 is moved outwardly to open the closure slide 100, is compressed between the hooked portion 104 and a screw plug 108. Nuts 109 on the outer end of the rod 103 permit of adjustment of the stroke of the closure member. The spring 107 acts to close the slide 100 when the cam 12 allows of this action which is designed to be a sudden one and is timed to take place before the nozzle has been retracted from its seat and even while the pump pressure is still being maintained. A small retaining plate 110 bridges the slide 100 and is secured to the base plate 94 of the mold to hold the member 100 and guide it during its opening and closing motions.

Above the mold base including its plate 94, and its lining plates 98 and 99, and above the slides 100 and 101, are two side blocks or bolsters extending longitudinally of the mold and at right angles to the slides 100 and 101. The front side block 111 is positioned in front of the nozzle port and the back side block 112 is behind this port. They are spaced apart for the reception between them of the mold proper or mold unit which consists of a readily removable and exchangeable element consisting essentially of two side plates, cheek pieces or type blocks held in spaced relation by a point block and having a slot for the working of the mold blade; these cheek pieces form the sides of the mold cavity, one end of which is formed by the forward end of the mold blade, and the other end by the rear end wall of the type or strip increment or element last cast and partly ejected from the mold by the forward movement of the mold blade; the bottom of which cavity is formed by the lining plates 98 and 99 and by the slides 100 and 101 and the top by the point block or the matrix in case a matrix is employed. The mold unit is positioned over the nozzle port and the side blocks are moved to clamp the unit between them after which the whole is secured together by horizontal bolts and the side blocks are secured to the mold base by vertical bolts.

The mold unit shown (Fig. 22) comprises the front cheek piece or type block 113, and the back type block 114, these blocks being secured in separated relation by the rear point block 115 and the forward point block 116 and the structure being preferably held together by screws 117. The thickness of the point blocks corresponds approximately to the point size of the mold which is also the thickness of the mold blade, it being understood that the latter extends between the type blocks so as to be slidable therebetween, the upper edge of the blade sliding along the lower edge of the rear point block 115: the forward point block may in practice be made slightly thicker than the rear point block. The outer end of the mold blade is connected directly or indirectly to the mold blade carrier 72 as previously described. If no matrix is to be used with the mold unit, the type blocks may be uniformly of a height corresponding to the sum of the height of the blade and the point block height and the latter may be in a single, preferably slightly tapered, piece extending the full length of the type blocks. To adapt the unit to general use, including the employment of changeable matrices to produce products of a variety of printing faces, the central portions of the type blocks are cut away to produce registering cross grooves, the bottom wall of the groove in the type block 113 being indicated at 118 and that of the type block 114 at 119. The point block 115 extends at 120 slightly forward of the rear walls of the grooves 118 and 119 and the point block 116 extends at 121 slightly rearward of the forward walls of these grooves: the portions 120 and 121 form gage surfaces as will be explained hereinafter. The inner or front wall of the back type block 114 is provided with two grooves 120' (Figs. 13 and 20) extending approximately the length of the rear point block 115, these grooves being for the reception of the ribs 90' of the mold blade extension previously referred to, it being understood that these grooves are unnecessary when no ribbed extension is used and may in such case be omitted.

The forward and rearward walls of the back type block 114 are cut away slightly so that the point blocks 115 and 116 extend beyond such cut-away portions as indicated (Fig. 22) at 122 and 122' to form gage surfaces as explained hereinafter. The depth of the grooves 118 and 119 is approximately the same as the height of the point block 115 and the height of the type blocks below the grooves corresponds approximately to the height of the mold blade. The groove bottoms 118 and 119 are conveniently bevelled at their outer edges, as shown in Figs. 7 and 22, each leaving a relatively narrow horizontal seat for ensuring a high pressure contact with the matrix. The forward end of the front type block 113 has a horizontal kerf 123 to provide a spring tongue 124. The forward point block 116 is less in height than the rear block 115 to allow of ejection of product without injury to its face. The proximate faces of the blocks 113 and 114 may be provided with longitudinal grooves 123' located at about the level of the walls 118 and 119 and of slight depth, these grooves serving to allow fine chips or fringes of metal to be carried away by the product instead of being cut off and piled up under the matrix these fringes being formed at times by the accidental escape of metal between the matrix bottom and its seat on the surfaces 118 and 119.

The mold base member 94 is provided at each end with upstanding gage pieces 125 having front vertical gage surfaces 126 and back gage surfaces 127, these surfaces being at the level of the point block portions 122 and 122' of the mold unit when the latter is assembled on the base plate. The mold unit shown in Fig. 22, when placed on the base plate is moved back until the point block portion 122 abuts against the gage surface 126 of the rearward gage piece 125 and the point block portion 122' abuts against the gage surface 126 of the forward gage piece 125. This positions the casting cavity of the mold unit properly above the nozzle port and is illustrated particularly in Figs. 18 and 19 showing small point size mold units and their relation to the center line of the nozzle. To properly position a larger point size mold it may be made with its point blocks provided, as shown, at 116' in Fig. 23, with two separated projecting portions 122'' at each end of the unit to abut against the gage surfaces 127 as will readily be understood. With this construction the mold unit is positioned as shown particularly in Fig. 20, the center line of the nozzle being drawn so that the position of the casting cavity may be compared with that of the small point size cavities shown in Figs. 18 and 19. The adjustment of the pin 102 and of the abutment 101 are also shown in Figs. 19 and 20. In general, the smaller mold units are constructed to be gaged by the surfaces 126, while those of larger point size are gaged by the surfaces 127. It will be observed that the operator does not need to make any adjustments of the mold unit, the proper position being determined automatically by the construction of the unit in co-operation with the gages 125: the endwise positioning of the unit is also automatically gaged, the end walls of the back type block fitting between the side walls of the gage pieces 125. The latter are secured to the base block 94 by screws 125'. The shoe 99' is secured by screws 99'' to the block 94 outside of one of the gage pieces 125, and clearance holes are provided in the shoe for the screws 125'. When the screws 99'' are tightened the shoe presses against the edge of the lining piece 99 to clamp the abutment piece 101 as a point block in the manner, and for the purpose previously referred to.

When the mold unit has been positioned as described the front block 111 and the rear block 112 are moved against the sides of the unit and the whole is clamped together by the horizontal bolts 128 passing through the bolt holes 128' shown in Fig. 22. The side blocks are also secured firmly to the base plate by the vertical bolts 129 passing through the holes 129' (Fig. 22) which holes in the blocks are larger than the diameter of the bolts to allow adjustment of the blocks.

The side blocks 111 and 112 are provided with water-cooling channels 130, the inlets being through the valved pipes 131 and the outlets through the pipes 132. The former is connected with a source of supply under pressure through pipe 133 and the latter leads to the drain 134. It will be noted that each side block has its own separate, controlled water-cooling system: each is independent of the other and since the water does not pass out of its block through a joint into another part of the mold, there is absolutely no possibility of leakage within the mold structure. The water channels 130 are as near as possible to the mold unit and the cast within the latter is chilled by the ready conduction of heat through the thin type blocks to the large mass of relatively cold metal constituting the side blocks.

The front block 111 is provided near its forward end with a cross cavity in which is located a plunger 136 (Fig. 14), the end of which contacts with the spring tongue 124 of the mold unit and the head of which is engaged by a compression spring 137 which latter may be compressed by the screw plug 138, the outer end of which may be engaged by a screw driver to change the amount of compression of the spring and thus the force by which the plunger is urged against the tongue. The plug, spring and plunger act upon the tongue to squeeze it against the product issuing from the mold so as to hold the latter frictionally; the amount of friction depends, obviously, upon the adjustment of the plug and is in practice sufficient to hold the product against the hydraulic pressure of the molten metal during casting while allowing it to be ejected after the casting operation by the motion of the mold blade.

When the mold unit is provided with the registering grooves 118 and 119, previously mentioned, the front and back side blocks are cut away to form grooves, the bottom wall of which is indicated at 139 for the front block 111 and that of the back block 112 as indicated at 140, these grooves registering with each other and with the grooves 118 and 119. Located in these grooves are the matrix guiding blocks, the front matrix block 141 seating in the groove 139 of the front side block 111 and the back matrix block 142 seating in the groove 140 of the back side block 112. The back matrix block is provided with vertical gage surfaces 143 and 143' and the block is positioned by moving the block until these surfaces come against the back walls of the point block gage portions 120 and 121 respectively. The surfaces 143 and 143' are extended upwardly by guiding posts or projections 144 and 144'. The front matrix block 141 is provided with similar posts 146 and 146' which at their upper ends may be formed with rearward gaging projections 147 and 147' so that the front block may be positioned by moving it back until these gages 147 and 147' come against the extended vertical gage surfaces 143 and 143' respectively of the back matrix guiding block 142, these contacts being above the level of the point block portions 120 and 121. The point blocks thus determine automatically the proper positions of the matrix guiding blocks and no adjustment or special manipulation on the part of the operator is necessary. When the blocks are positioned, vertical screws 148 (Fig. 12) extending through holes 148' are employed to clamp the matrix blocks to the side blocks and the base block. The holes 148' in the blocks 141 and 142 are larger in diameter than the bolts so as to allow of positioning movements of the blocks. When assembled the matrix blocks 141 and 142 are preferably locked by the horizontal screws 141' screwthreaded in the cross bars 142' which are in turn held by the two central bolts 128 at their ends, thus preventing lateral movement of the matrix blocks particularly by expansion of the mold unit under operating conditions.

The matrix guiding blocks are provided at their proximate faces with grooves to form the matrix well 149 when the blocks are assembled as shown in Fig. 22. The middle portion of the well is wide enough to accommodate the matrix 150 together with its holder 151. At the ends of the well the groove in each block is narrower so as to form guiding faces for the sides of the matrix near the ends thereof. The narrowed portion of the well extends upwardly through the posts 144—146 and 144'—146' and the matrix well is of the same length as the matrix 150 so that the end walls of the narrowed portion of the matrix well serve to guide the end walls of the matrix 150. The matrix when assembled in its holder so as to be moved in an upward and downward direction is at all times guided at the ends of the matrix and at the sides of the matrix near the ends thereof by that portion of the matrix well which is located in the posts above mentioned. The posts are sufficiently high to guide the matrix at all times during its up and down movement, and the construction is such that the matrix is thus guided by an integral part of the mold itself. It will be understood that when moved downwardly the matrix seats upon bottom walls 118 and 119 of the type blocks 113 and 114 and more particularly, in the construction shown, upon the narrowed horizontal portions or seats of these walls, which portions are produced by beveling these walls as referred to previously. The provision of a narrow seat insures a high pressure contact between the matrix and the type blocks.

The matrix is moved up and down in properly timed relation from the cams 11 and 11' through the intermediary of the lever 17. This matrix operating cam lever 17 is provided at its upper end with an eye 152 (Fig. 7) through which extends a rod 153 pivotally connected at its inner end with a toggle joint, the upper member 154 of which is pivoted at its top to the head 155' of an adjustable rod 155 and the lower member 156 of which is connected pivotally at its lower end with the matrix holder 151. The toggle members 154 and 156 are pivoted at their meeting ends to the rod 153 by means of a replaceable pivot pin 157 having a knurled head. Rising from the upper step 2' of the main stand and screwthreaded into the same are three posts 158 connected at their tops by a cross bar 159 anchored to the posts by nuts on top of the latter, the center of this bar being directly over the matrix. Extending vertically through this cross bar at approximately its center is the rod 155 previously mentioned. The rod extends axially through a sleeve 160, screwthreaded into the cross bar 159 so that when the sleeve 160 is rotated it will move downwardly the rod 155 by contact with its head 155'. A nut 161 on the end of the rod 155 above the sleeve 160 causes the turning of the sleeve 160 in an opposition direction to move the bar 155 upwardly. A nut 162 on the sleeve is serviceable to lock the rod 155 in adjusted position. The rod 153 previously referred to, is surrounded by a compression spring 163 extending between the eye 152 and the inner end of the rod 153. The outer end of the rod 153 is threaded and is provided with nuts 164. When the lever 17 is moved outwardly by its cams it acts upon the nuts 164 to move the rod 153 outwardly and collapse the toggle joint, the upper member of which being stationary merely pivots on its upper pivot connection with the head 155', while the lower member moves in an obvious manner and lifts the matrix upwardly from its seat. When the lever 17 moves inwardly it compresses the spring 163 and through the intermediary of this spring causes the toggle joint to seat the matrix under great pressure as will be apparent to those skilled in the art. The proper adjustment of the toggle and seating of the matrix is obviously accomplished by adjusting the parts 160 and 161. If the nuts 164 are removed the matrix will be held stationary in seated position by the spring 163.

The matrix holder 151 consists of a block which is cross grooved at the top as shown in Fig. 13, and is provided with a pin 165 by which it is pivotally connected to the lower ends of the toggle joint member 156. The sides of the block are under-cut and within these portions are secured the side plates 166 (Fig. 22) the lower edges of which are turned in and extend toward each other below the bottom of the block 151. These turned-in portions 167 indicated particularly in Fig. 22, co-operate with longitudinal side grooves 167' (Figs. 15, 16, 17) in the matrix 150. The plates 166 are approximately of the same length as the wide part of the matrix well 149, and the holder including the plates 166 is of a width corresponding approximately with the width of this portion of the matrix well 149. The holder is reduced in width at its ends to form vertical notches 168 (Fig. 22) so that the width of the holder at its ends is slightly less than the width of the matrix and such that it works up and down nicely between the matrix guiding faces of the posts 144—146 and 144'—146'; the length of the matrix holder over all is approximately that of the matrix well 149. By removing the pin 157 of the toggle joint, the joint member 156 and the matrix holder and matrix may be moved upwardly out of the matrix well and the matrix itself may then be removed from its holder obviously by sliding it longitudinally.

The matrix is of a length corresponding with the length of the matrix well, this length being not shorter than the longest non-fused cast or fused increment to be produced, and is provided with the longitudinal side grooves 167', previously mentioned, which extend throughout the full length of the matrix. The bottom of the matrix may be flat if a product without special face is required, or it may have an impression of a face which extends from a point at a distance from one end of the matrix to the other or exit end thereof, for producing either continuous fused or non-fused product as shown for example in Fig. 15. A fancy border matrix, as shown in Fig. 16, is provided with impressions corresponding with the border design which extend similarly to the impression shown in Fig. 15. If desired, however, the design may stop short of the exit end of the matrix from which point a groove 169 may be provided, this groove being as wide as, or preferably slightly wider than the design, and as deep as and preferably slightly deeper than the depth of the fancy border impression in the matrix. This groove 169 is in the nature of a clearance groove and should be of dimensions such that it will not interfere with the face produced on the product when the matrix is seated for another cast. The matrix shown in Fig. 17 is designed for use particularly in connection with the production of non-fusion slugs and has its design impression in its center. With the matrices shown in Figs. 16 and 17 it is necessary that after each cast the matrix be moved upwardly as described previously. When however product is being made with a blank matrix or a matrix such as shown in Fig. 15, it is not necessary to move the matrix up after each cast, and consequently the nuts 164 on the rod 153 are removed so that, although the matrix cam operating lever 17 moves backwardly and forwardly a tension is at practically all times on the spring 163 to keep the matrix in its lowermost or seated position.

One of the many features of this machine is its practical ability to cast relatively long increments or elements, a condition which makes it difficult generally to produce casts which are solid and have a good face and particularly fused increments having perfect fusion therebetween. While the machine will operate under certain conditions with an ordinary nozzle, such as that shown in Patent No. 1,222,415, previously referred to, a nozzle having a plurality of holes such as that shown particularly in Figs. 13 and 24, which nozzle is an essential part of this invention, has been found to be of importance in connection particularly with long casts and high speed operation of the machine. This nozzle 170 (Figs. 13 and 24) is provided with the usual conical seat which periodically comes against the nozzle plate 97 and is lowered therefrom by the usual and regular pump mechanism. Through the axis of the nozzle is a central bore 170' which extends from the outlet of the pump to a point slightly short of the upper end of the nozzle. Through this upper end are two bores 170" connecting at or near their junction with the central bore 170' and extending fanwise in a plane corresponding with the longitudinal plane of the mold or the plane in which the mold blade moves. The metal forced by the pump through the channel 170' is converted into two streams and spread into a fan-shaped discharge by the bores 170″, it being understood of course that instead of two bores 170″ there may be a larger number. The stream of metal through the bore 170″ which is nearest the exit of the mold encounters the section of product last cast and washes over the end surface of this section so as to produce a good fusion thereto, (Fig. 24) while the metal injected into the mold through the other passage or passages 170″ serves to fill the mold quickly, it being unnecessary and undesirable particularly in the case of large volume casts to cause all of the metal forming the cast to wash against the section previously cast in order to produce good fusion. On the contrary a relatively small fusion stream has been found sufficient provided there is injection through other passages of sufficient metal to completely fill the mold cavity quickly, that is in plenty of time before the freezing of the metal has set in. In other words, it is necessary under certain conditions particularly with large volume casts and high speed to fill the mold cavity completely quickly, and for this purpose a plurality of nozzle outlet passages is of value, especially in connection with fusion casts in which case one at least of the outlets directs the metal to produce a good fusion while another at least directs the metal in a direction to accomplish the proper filling of the mold cavity.

It is of course desirable at all times to keep the nozzle hot so that the metal in its bores 170′—170″ will not freeze. For this purpose a shield may be provided in the form, as shown, of a conical sheet iron member 171 secured to the under side of the base block 94 by screws 172 (Fig. 7) with a nonconducting air space 173 filled, if desired, with asbestos packing between this member and the walls of the conical hole in the block 94. This shield surrounds the nozzle and comes close at its upper end to the nozzle plate 97, being concentric with the nozzle seat therein. The provision of this nonconductor of heat about the nozzle largely prevents the heat of the nozzle being dissipated and at the same time prevents the mold base and other mold parts becoming unduly heated. The shield itself becomes hot enough to cause any splashes of metal which may impinge upon it to run off into the pot instead of adhering and building up into a mass in the vicinity of the nozzle seat.

Figure 25:
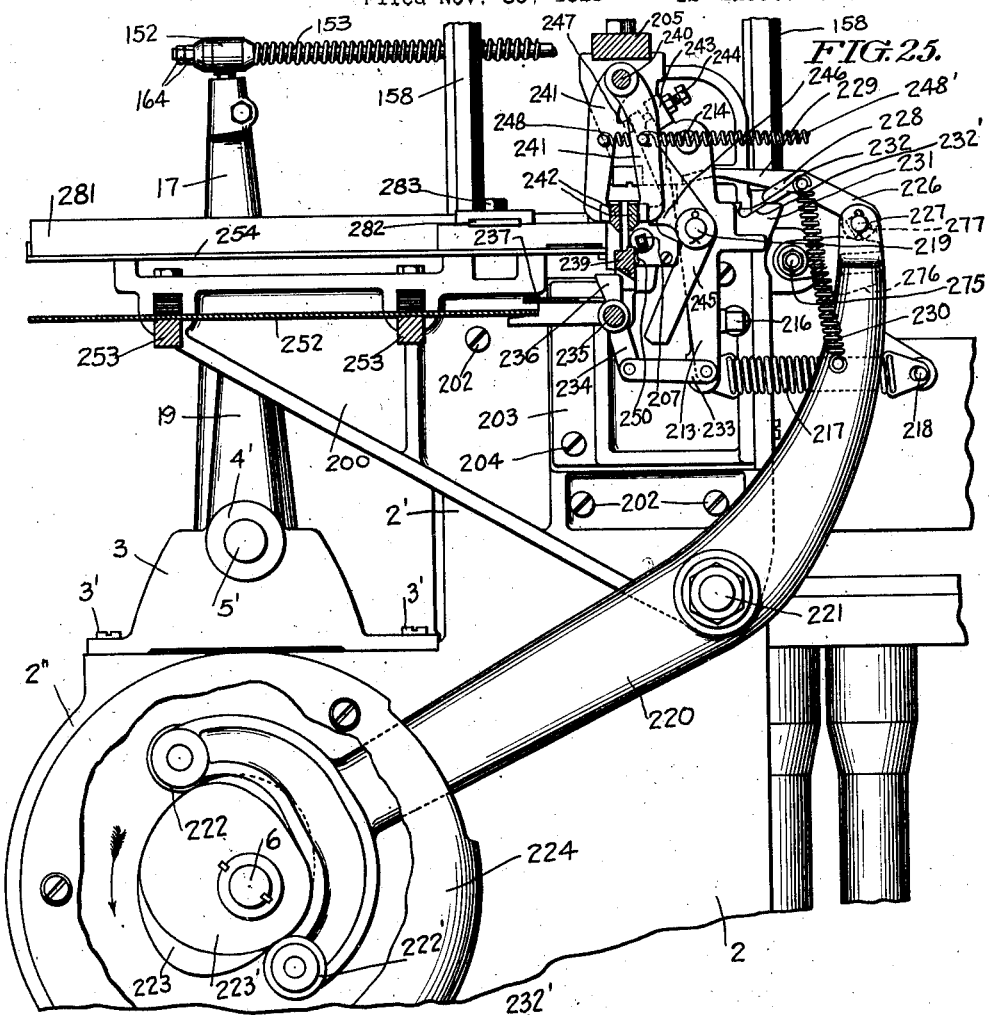
Fig. 25 is an end elevation of the product-tripped cutter mechanism.
Figures 26, 27:
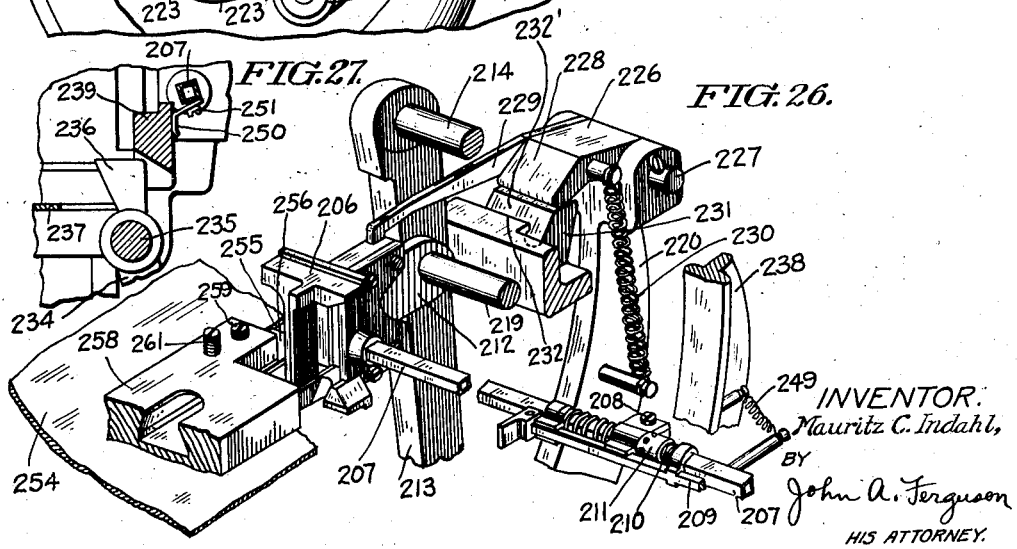
Fig. 26 is a perspective view of certain portions of the cutter mechanism shown in Fig. 25.
Fig. 27 is a detail sectional view showing the braking device for the cutter mechanism.

The machine described is provided with a tripped cutting mechanism, that is, a mechanism which is tripped or set in operating position by the end of the strip as it issues from the machine. The cutting mechanism is in general like that disclosed in U. S. Patent No. 1,193,344, dated August 1, 1916. The patented mechanism however was designed as an attachment to a type casting machine, as disclosed in the patent, and was arranged to swing with the melting pot and to be operated by mechanism controlled from the type casting machine. The present cutter mechanism is considerably simplified and embodies a number of improvements as compared with the patented cutting mechanism. A bracket 200 provided with the horizontal table portion 201 is secured by screws 202, (Fig. 25) to the right end of the main casting 2 of the machine, the table 201 resting on the top of the upper step 2′ of said casting. A bracket or frame 203 is secured to the bracket 200 by screws 204, this frame 203 supporting the cutting or shearing mechanism and provided with a horizontal extension 205. The frame 203 and the extension 205 correspond with similar parts in the patented structure but the frame differs, being open at the front so that the shearing carriage is in full view at all times and can readily be observed and manipulated by the operator. This shearing carriage 206 is longitudinally slidable in the bracket 203 and is provided with a longitudinally extending gage rod 207 upon which is mounted an adjustable gage with which the end of the type metal strip is adapted to contact, as in the patented mechanism. The gage embodies a clamp 208 (Fig. 26) adapted to be set in any desired position of adjustment along the rod 207 and a slide 209 having collars surrounding the rod, and an interposed spring, these parts being as shown in the patent. Between the clamp 208 and the foremost collar is interposed a screwthreaded sleeve 210 provided with a square axial opening for sliding on the rod. Screwthreaded on this sleeve is a collar 211 which can be turned to cause the slide to move relatively to the clamp under tension of the spring. The employment of this sleeve and its associated collar provides a micrometer adjustment of the slide 209 and therefore controls minutely the length of the strip desired to be cut. The carriage with both its fixed and movable blades is set longitudinally in the frame 203 by the action of the end of the strip against the usual gage projection on the gage slide 209. The movable blade or cutter 212 is adapted to be moved transversely of the strip in order to sever it, by the lever 213 pivoted at its upper end on a pin 214 secured in the lugs 215 on the rear side of the bracket 203. The lower end of the lever 213 is normally drawn against the stop 216 on the frame 203 by the spring 217, one end of which is attached to the lower end of lever 213 and the other end of which is attached to a pin 218 secured to a rear extension on the bracket 200. At an intermediate point the lever 213 is provided with a pin 219 which extends through a hole in the movable blade 212. The pin 219 is of such length that the carriage 206 can move longitudinally a sufficient amount under the action of the strip, the blade 212 sliding along the rod 219. The movable blade is normally separated from the fixed blade to allow the strip to pass between the blades. It is actuated to sever the strip by a lever 220 pivoted intermediate its ends to the bracket 200 by a bolt 221. The lower end of lever 220 is bifurcated and is provided with rollers 222—222' to co-operate with a pair of cams 223 and 223' keyed to the shaft 6. These cams, as may be observed in Fig. 1, are near the right end of shaft 6 outside of the main stand of the machine. They are conveniently covered by a casing 224 and the end of the shaft is extended beyond the casing and is provided with a hand wheel 225 for manually turning over the machine in a well-known manner. The upper end of lever 220 is provided with a pawl 226 pivoted to lever 220 at 227, this pawl being provided at its free end with a forwardly and downwardly projecting extension 228. The pawl 226 is also provided with a horizontally and forwardly projecting finger 229, the end of which is adapted normally to rest upon the cutter carriage 206. The finger 229 is maintained in sliding contact with the top of the cutter carriage by a spring 230, one end of which is connected to the lever 220 and the other end of which is connected to the pawl 226. The extension 228 under normal conditions is above the lug 231 provided on the back of lever 213 to the rear of the rod 219. The lug 231 is provided with a depression in its upper face the forward edge of which forms a shoulder 232. It will be readily understood that the lever 220 is reciprocated by the cams 223 and 223' and that the pawl 226 moves forwardly and rearwardly during each revolution of the shaft 6, or in other words, during each cycle of the machine. The extension 228 moves above the lug 231 as long as the finger 229 slides upon the top of the cutter carriage 206. When however the strip produced by the machine acts against the gage on the rod 207 and causes the carriage 206 to be advanced, the finger 229 will drop behind the carriage 206, as shown in dotted lines in Fig. 28, under action of spring 230 and the pawl extension 228 will drop into the depression of the lug 231. When the pawl is moving forwardly it comes against the shoulder 232, and further motion will obviously cause the lever 213 to swing on its pivot 214 and operate the movable blade 212 of the cutter. The operation of this blade occurs at a time when the strip itself is at rest. The width of the shoulder 232 and of the pawl extension 228 is sufficient so that they will come into engagement no matter where the cutter carriage has been set by the operation of the strip, it being understood of course that the amount of movement of the cutter carriage is limited so as to be in no case greater than the amount of feed of the strip which is generally the length of the cast being made during each revolution of the machine. On the return movement of the lever 220 the extension rides upwardly on the cam surface 232' formed by said depression in the lug 231 and thus lifts the finger 229 out of the path of movement of the cutter carriage under the action of its return spring 249. The lug 231 extends parallel with and behind the rod 219 and serves to connect the two arms of lever 213, the lever being H-shaped. The forward arm of this lever is connected by a link 233 with a lug 234 extending downwardly from the rocker shaft 235, said shaft being similar to that of the patent. When the lever 213 is operated to sever a strip, the shaft 235 is rocked so that its lugs or projections 236 are moved to the rear to allow the severed strip to fall on the table 237. When the lever 213 returns to its normal position under the action of spring 217, the projections 236 are moved forwardly to push the severed sections of strip along the table 237 to stack the same and make room for the next section. Extending downwardly from the part 205 are two supporting arms 238 which support in the usual manner the horizontal track or way 239 upon which the strip slides, after it has been pushed out of the mold beyond the cutter carrier, this way 239 being parallel with and a little in front of the square gage rod 207. This track 239 forms a support for the rocker shaft 235 and for the table 237. Immediately below the part 205 and parallel thereto is a shaft 240 from which is supported by the hangers 241 the supporting guides 242, these hangers being of the general construction of those shown in the patent. The forward arm of the lever 213 is provided at its top with a lug 243 equipped with a set screw 244, which contacts with the upper end of the lever 245 pivoted intermediate of its ends to the shaft 219 and provided in the vicinity of its pivot with a forward extension 246. When the lever 213 moves forwardly it carries the lever 245 with it, and the projection 246, being normally in or near contact with the rear supporting guide 242 swings the latter and with it the front guide on their pivot 240, the strip being between the guides. The strip is thus moved in front of the way 239, the lugs 236 being at this time in a rearward position so as to allow the severed strip to drop on the table 237. In order to free the strip and to allow it to drop freely, the forwardly supporting guide 242 is moved beyond the movement of the rear guide by the action of lever 245, the lower end of which at this time comes in contact with the rocker shaft 235 and causes the upper end of lever 245 to operate against a rear lug 247 (Fig. 25) on the forward hanger 241. The end of the set screw 244 comes against the upper end of lever 245 when the guides 242 are returned to normal position, in which position the rear guide 242 substantially contacts with the extension 246 on lever 245. The return of the guides 242 is accomplished by springs 248 and 248', the former spring connecting the supporting arm 238 nearest to the cutter carriage with the front hanger 241, and the latter spring connecting said arm with the rear hanger 241. In this zero or normal position the lug 247 of the front hanger 241 rests against the lever 245 at a point opposite to the contact of said lever with the said screw 244. The latter is adapted to be adjusted to cause a separation of the guides 242, as will be obvious, so as to form a space between the guides through which the strip may advance without interference. A spring 249 secured at one end to the outermost supporting arm 238 and at its other end to a post secured to the gage rod 207 near the outer end of the latter serves to return the gage rod and the cutter carriage to zero position after each cutting operation. In this zero position the cutter carriage comes against the bracket 200.

The cutter carriage is designed to have a relatively long stroke, because the machine is capable of casting relatively long increments of fused strip material; the speed of the machine is also relatively high. These factors of long stroke and high speed result in a tendency to cause the cutter carriage, particularly after a long movement longitudinally to jump back with great speed to zero position under the action of the spring 249. Upon striking the zero stop under these conditions, the carriage is apt to rebound slightly and to vibrate in such a manner as to cause the next cutting of the strip to be inaccurate. Particularly to prevent this rebound a friction brake device in the form of a spring plate 250 is secured by screws 251 (Fig. 27) to the gage rod 207, a portion of this plate being maintained by these screws in sliding contact against the way 239. The plate meets the rod 205 at a slight angle so that by tightening or loosening the screws 251, the pressure of the plate upon the way may be regulated. With this adjustable regulation of friction, the rod 207 and the cutter carriage are returned under the action of the spring 249 without appreciable retardation, but the rebound effect is practically eliminated because of the static friction between the plate and the way. In practice the provision of this friction plate produces accurate cutting at high speeds on long strokes.

In front of the plate 237 and overlapped by said plate is the galley plate 252 supported on rods 253, the ends of which are supported in the bracket 200. The galley plate 252 and the plate 237 act together to form a table for receiving the strip material after it has been cut and stacked.

Figure 28:
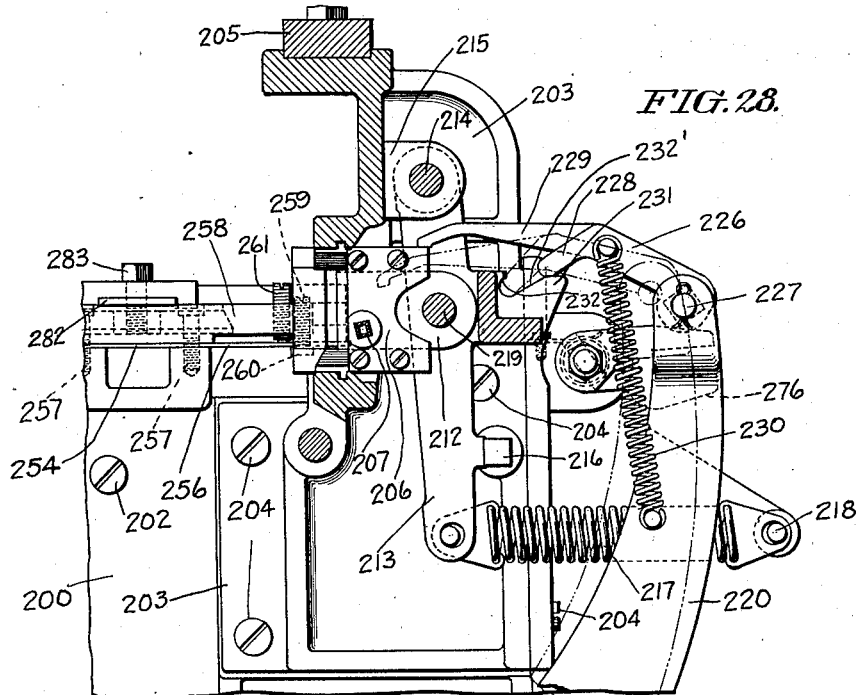
Fig. 28 is a sectional view of the cutter mechanism of Fig. 25, the section being on approximately line 28—28 of Fig. 29.
Figure 29:
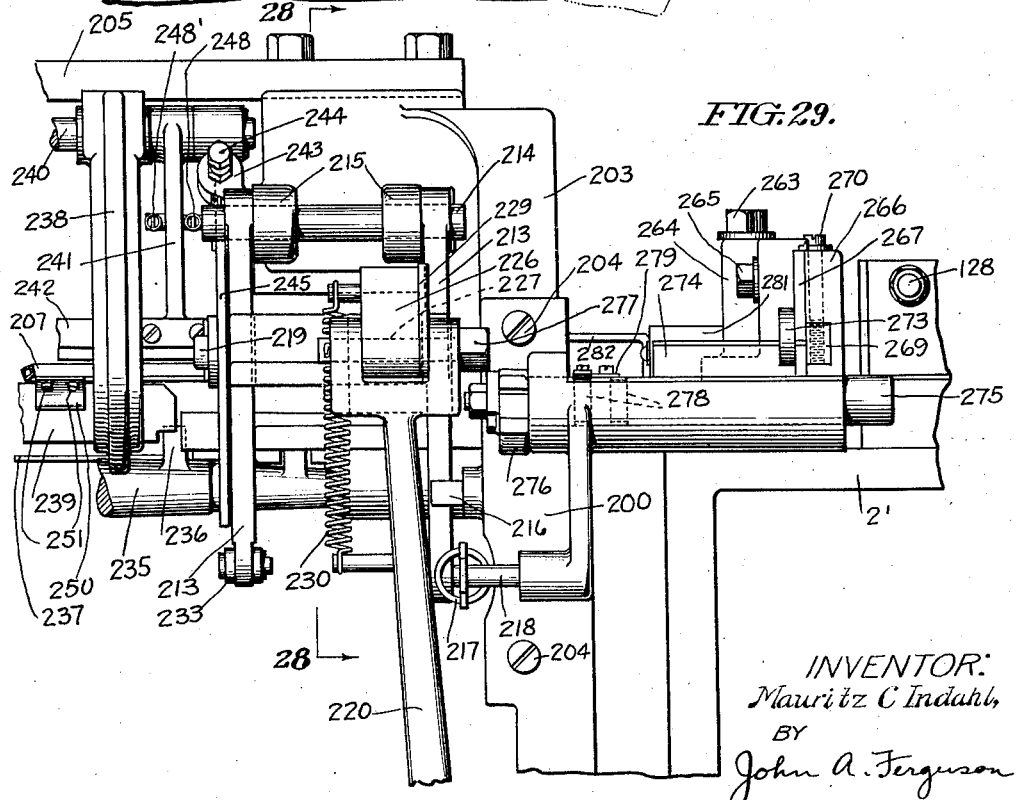
Fig. 29 is a rear elevation of that part of the cutting mechanism which is in the neighborhood of the cutting blades.
Figure 30:
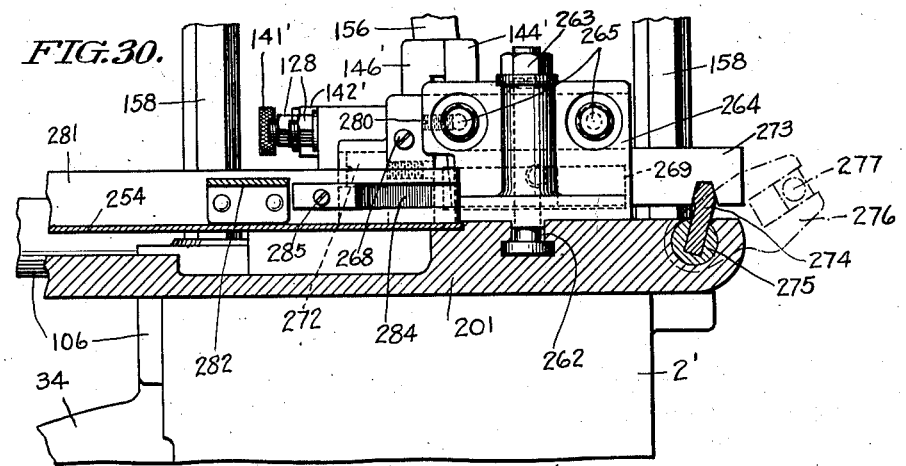
Fig. 30 is a sectional view on approximately line 30—30 of Fig. 31, illustrating the cutter and stacker adapted to be actuated during each revolution of the machine.
Figure 31:
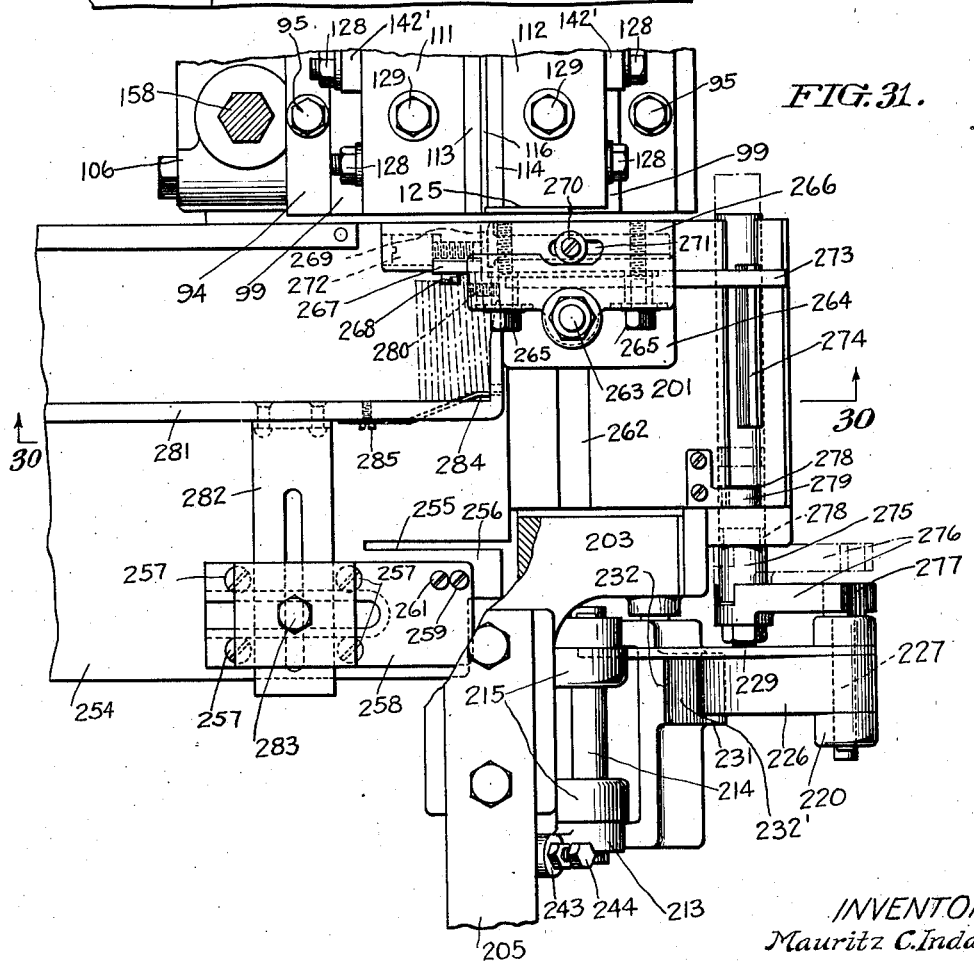
Fig. 31 is a plan view of the cutter and stacker mechanism shown in Fig. 30, and showing also portions of the mold and of the tripped cutter.

The strip material produced by the mold emerges therefrom with the base portion or foot of the material passing above the horizontal table portion 201 of the bracket 200. The upper surface of the table 201 at this point is formed into a smooth finished table by a sheet iron plate 254. This plate being slightly below the foot of the typographical product it does not interfere with the progress of the product as it moves from the mold toward and between the blades of the tripped cutter. The plate is provided with a slot 255 (Fig. 31) extending transversely to the direction of movement of the product thus forming the spring tongue 256. Secured to the top of the plate 254 by screws 257 is a block 258, having a portion extending over the tongue 256, there being a slight clearance between the tongue and the bottom of the block. Screwthreaded in the block 258 is a screw 259 which extends vertically through the tongue 256 on the underneath side of which the screw is provided with a head 260 (Fig. 28). A short distance in front of the screw 259 is the screw 261 which is screwthreaded in the block 258, and the lower end of which rests against the top of the tongue 256. It is apparent that by manipulating the screw 259, the tongue can be moved upwardly, and by manipulating screw 261, the tongue may be moved downwardly, and that proper adjustment of these screws not only moves the tongue to a desired level, but also locks it in adjusted position. The material passing over the plate 254 is supported at a proper level by the tongue 256 immediately before it feeds into the cutter device previously described. The proper leveling of the strip at this point is necessary in order to insure the strip produced being absolutely straight along its top and bottom edges. The rear top surface of the bracket portion 201 is dressed to the same level as the plate 254 and is provided with an undercut T-slot 262 which extends from one side of the block to the other, or from a point adjacent to the mold to a point adjacent the tripped cutter frame 203. A vertical bolt 263 provided with a head which is slidable in said T-slot adjustably secures to the bracket portion 201 a stacker device, which is adapted to be operated from the lever 220 for the purpose of stacking particularly non-fused elements produced by the machine. This stacker is provided with movable cutting edges so as to shear the material if necessary. When in use this stacker is adapted to operate once for each revolution of the machine. Since the non-fused elements are adapted to be produced one for each revolution of the machine, the stacker operates upon each non-fused element and causes it to be moved on its feet laterally against the preceding element. The use of this stacker is not confined to non-fused elements, but may be used with fused elements, in which case, however, it will cut and stack for each revolution of the machine and the length of the pieces cut will in that case be equal to the stroke of the mold blade. While it is true that the stacker may be used upon fused product, it is designed particularly to be used in connection with non-fused elements, whereas the tripped cutter previously described is adapted to cut and stack fused elements. In this way the two main products of the machine, namely, fused and non-fused products, are capable of being taken care of by the two cutting and stacking devices, each operating from the same cam and through the same operating lever.

The construction of the non-fusion cutter will now be described. The vertical bolt 263 pierces a bracket 264 supported on the part 201 and provided with a cross lug on the bottom for entering the slot 262, previously mentioned, whereby the bracket may be moved on the part 201 toward and away from the mold and locked in adjusted position by tightening the nut on the bolt 263, the lug on the bracket preventing the latter from side twisting or rotation on the bolt. Secured to the bracket 264 by cross screws 265 is a guiding block 266 which extends crosswise of the slot 262 and crosswise of the strip material as it issues from the mold. The screws 265 pass through holes in the bracket and are screwed into the block. On the face of this block between it and the bracket 264 is a wearing plate 267 secured by the screws 265 and also by the screw 268. The block 266 and the wearing plate 267 are notched or slotted from their edge contacting with the part 201 so as to form a space or cavity through which the strip product may pass. A plunger 269 to which is secured a vertical screw 270 accessible from the top of the block 266 and movable crosswise of the strip in a slot 271 in said block, is adapted to be moved so that its head in the cavity, previously referred to, may be made to come against the strip material and hold the latter against the forward wall of the said cavity. It will be observed that the adjustment of the plunger may be accomplished by loosening the screw 270 and moving the plunger thereafter to its desired adjustment, after which the screw may be turned to clamp the plunger in adjusted position. A screw 272 having an enlarged head may be manipulated from the front end of the block 266, its head being adapted to come against the wearing plate 267 to adjust said wearing plate crosswise of the product and therefore adjust the wearing plate relatively to the block 266, so as to bring the forward wall of the cavity in each in substantially the same vertical plane. This wall of the wearing plate is beveled to form the fixed blade of the cutter. The movable blade 273 of the cutter is set so as to be movable crosswise in the bracket 264 between said bracket and the wearing plate 267. The forward edge of this blade is adapted to traverse the cavity, previously referred to, during its forward stroke and to leave said cavity open for the passage of the strip product while in retracted position. In any position the movable blade is in contact with the wearing plate and during its forward motion it acts in conjunction with the fixed blade to sever the material. The rear end of the blade 273 projects beyond the bracket 264 and is provided with a notch in its lower edge for co-operation with the operating blade 274 set radially in a shaft 275 having bearings in the machine part 201 below the top thereof. The shaft 275 extends throughout the length of the part 201 and the blade 274 is sufficiently long so that it will operate the movable blade 273 whatever the position of adjustment of the cutter mechanism may be longitudinally of the slot 262. The shaft 275 is provided on its end with an arm 276, the end of which is forked for the reception of a pin 277 projecting laterally from lever 220 and being an extension of the pivot 227 at the upper end of said lever. The shaft 275 is provided with two annular grooves 278 each adapted to co-operate with the clip 279 secured to the upper face of the member 201, and having a spring tongue for engagement with either one of the slots 278. It will be apparent from an inspection of Figure 30 that the arm 276 and the shaft 275 may be moved longitudinally after the clip 279 is manually held away from the shaft 275. This longitudinal movement may be from the position shown in full lines in which the pin 277 is engaged with the forked end of the arm 276 and the tongue 279 is in one of the grooves 278, to the dot-and-dash position in which this engagement or connection is broken and the spring tongue 279 is in the other groove 278. In either engaged or disengaged position the tongue 279 obviously locks the shaft 275 from accidental longitudinal movement. A screw 280 is provided in the bracket 264 to adjustably come against the forward screw 265 as a stop for positively preventing the forward movement of the guiding block 266 and wearing plate 267 due to pressure against the fixed blade during the cutting operation. In assembling this blade should be in direct line with the front face of the product as it issues from the mold and such adjustment is made by loosening the screws 265 and moving the block 266 which carries the blade with it, the holes for the screws 267 in the bracket 264 being enough larger than the screws to permit of this adjustment. When adjusted, these screws are tightened and the locking screw 280 is turned against the forward screw 265 to prevent forward movement of the block relatively to the bracket. The plunger is adjusted in an obvious manner by manipulating the screw 270 and is set so that the distance between the end of its head and the fixed blade is slightly greater than the point size of the material to be severed. The material is thus held in vertical position on both its front and back faces during the severing operation, the latter being performed by the movable blade 273 through its connections with the vibrating lever 220. When it is not desired to operate this device the connection is broken at the point 277 as hereinbefore described. In this case the product will traverse the opening between the fixed cutter and the plunger head 269 being guided by said parts and will proceed into the zone of operation of the tripped cutter which has previously been described.

In the practical use of this device, it has been found desirable for stacking purposes to utilize the gallery wall 281 which is secured to a slotted bracket 282, the latter being adjustably mounted on the block 258 previously referred to. This block is provided with a T-slot at right angles to the slot in the bracket 282. This T-slot receives the head of the bolt 283, which passes upwardly through the slot in the bracket 282 and is provided on its upper end with a nut. By loosening the bolt nut, the bracket 282 and the galley wall 281 may obviously be moved longitudinally of the strip produced or crosswise thereof and thus may be made to accommodate itself as to position for a product of any definite length. Its position is generally about one strip element from the cutting blades, and because the adjustment of the latter depends upon the mold blade, the adjustment of the galley wall also depends upon the mold blade adjustment. The rearward end of the galley wall 281 is turned or bent toward the cutter blades and is provided with a leaf spring 284 secured to the galley wall 281 by a screw 285. The spring extends through an opening in the galley wall so as to be contacted by the end of the non-fused material produced by the mold.

The adjustment of the cutter blades by loosening bolt 263 and sliding the mechanism along the slot 262, is such that the severing plane of the blades or the rear end of the movable blade will come opposite a joint between two adjoining non-fused strips or elements, the one nearest the mold being confined between the fixed blade and the plunger head and the element preceding this one being in a position to be engaged by the movable blade. The forward end of this element contacts with the spring 284. When the movable blade operates it pushes the rearward end of this element in a crosswise direction and after the blade has retracted the element is retained by the spring 284 with its rearward end against the fixed blade in front of the cutting edge thereof. After casting another element, the element succeeding the first element held by the spring 284 is pushed, by the motion of the mold blade acting through intermediate elements, into contact with the spring 284 behind the first element and between it and the bent end of the galley wall; this operation moves the forward end of the first element toward the front of the galley so that the second element is in turn held by the spring and may have its rearward end pushed by the movable blade and retained by the spring in contact with the fixed blade. In this way the elements are held both during cutting and after cutting and are delivered in standing position one against the other upon the plate 254 with their forward ends in contact with the galley wall 281. It the non-fused elements as they advance into the influence of the cutter are not entirely non-fused, but are slightly fused at their joints, the action of the movable and fixed blades of the cutter will cause a severing of these elements at the joint. In this way it is possible to handle non-fused material whether it is entirely non-fused or whether it may be fused more or less at the joint, the movable blade being regarded either as a pushing or a cutting member and the device as a whole either as a stacker or a cutter and stacker. If it is desired to make non-fused material of a different length from that previously made and the mold blade stroke is altered in a manner previously described in order to accomplish this purpose, then the cutter position must be altered so that the severing plane between its blades or the rear end of the pusher blade will come at the joint between adjacent elements. Thus the machine adjustment necessitates a corresponding cutter adjustment in order that production and cutting may be in harmony with each other. The joint between the elements at which the cutter operates may be one or more elements away from the casting cavity; that is to say, during casting, one element must be retained in the mold forward of the casting cavity so that its rear wall will form the forward wall of the casting cavity and the joint at which the cutter works should be between this element and the next preceding it, or between the second and third elements away from the cavity, or, generally, a multiple of element lengths away from the position of the forward end of the mold blade at the completion of its forward stroke.

This interrelation of mold blade stroke length and position with cutter position may be made use of when the latter is not in exact correspondence with a joint, in which case the micrometer stops of the mold blade may both be adjusted to move the stroke position without altering the length of the stroke, thus bringing the stroke position in harmony with the cutter position so that the latter will operate precisely at a joint between elements. If the mold blade should happen to hold up and fail to make a full stroke during one revolution and, as may happen, immediately recovers from this misoperation and operates correctly, the elements will issue so that there will be a displacement of the cutter with respect to the joint and the cutter will therefore cut one of the elements at a point which does not coincide with a joint. This will continue for possibly two more cutting operations, after which the machine will have adjusted itself automatically and the cutting will be correct at the joints, the only effect being the stacking of a few short pieces which must be thrown away. The cutter is employed under such misoperating conditions strictly as a cutter; whereas its general application is for the purpose of stacking material which does not need cutting because it has been made according to the non-fused method. It may be pointed out that inasmuch as this device is capable of cutting, it may be employed where fused product is made. In this case, since the cutting occurs once for each revolution of the machine and the casting also occurs in the same manner, it will happen that the pieces cut off will correspond with the length of the cast made. It may also be observed that by the removal of the galley wall 281 and by disconnecting the non-fusion cutter at the point 277, the fused material is allowed to travel through the non-fusion cutter as a guide to the tripped cutter, the gage of which may be set so as to produce pieces of material of desired length.

I claim:

1. A typographic mold having cavity-forming side and bottom walls the latter provided with a port for admitting molten metal, the walls of said port forming a nozzle seat, a movable blade the end of which forms one wall of the mold cavity, a closure member at the upper portion of said nozzle seat for opening and closing said port, means for introducing molten metal into the cavity through the inlet port, and means for operating said mold blade and said closure member.

2. A typographic casting machine comprising a mold having cavity-forming walls, one of said walls being provided with an inlet port, the walls of said port forming a nozzle seat, a nozzle, means for introducing molten metal through the nozzle and the said port into the mold cavity, means for moving the nozzle into its seat and away therefrom, a closure member for opening and closing the said port, and means for operating said closure member, the means for operating the closure member and the means for moving the nozzle being so related that the closing of the port is effected before the nozzle has retracted.

3. A typographic casting machine comprising a water cooled mold having cavity forming walls, one of said walls being provided with an inlet port, the walls of said port forming a nozzle seat, a mold blade, a closure slide movable transversely of the port to open or close the latter, means for introducing molten metal into the cavity, said means including a pot, a nozzle, and means to move the latter alternately from seating position, in which position the nozzle is cooled by the mold, to removed position in which the nozzle is heated by the molten metal of the pot, and means for operating said mold blade, said closure slide, and said nozzle moving mechanism, the timing relation being such that the slide is closed to retain molten metal in the mold cavity while the nozzle is seated, whereby the nozzle cooling or seating time may be shortened for each cast and the nozzle heating time increased thus preventing freezing of the nozzle.

4. A typographic casting machine comprising a mold having cavity-forming walls, one of said walls being provided with an inlet port, the walls of said port forming a nozzle seat, a nozzle, means for introducing molten metal under pressure through the nozzle and the said port into the mold cavity, a closure member for opening and closing the said port and means for operating the closure member, the latter means and the means for introducing molten metal being so related that the closing of the port is effected before the introduction of metal under pressure has ceased.

5. A typographic casting machine comprising a mold having cavity-forming walls, one wall being provided with an inlet port, the walls of which port form a nozzle seat, pump mechanism including a nozzle adapted to seat against said port wall with the inner end thereof extending in proximity to the mold cavity, and a closure member for said port operatable between the nozzle and the mold cavity.

6. A typographic casting machine comprising blocks forming side walls of a casting cavity, a base block forming the bottom wall of said cavity, an inlet port for molten metal in said base block, and a closure member for said port, the inner surface of said member in closed position being flush with the surface of said base block constituting the bottom of the said cavity.

7. A typographic casting machine comprising a mold having cavity-forming walls, one of said walls being provided with a nozzle opening, a closure slide movable transversely of said opening; means for reciprocating said slide to alternately open and close said opening, means including a pump for introducing molten metal through said opening into the cavity, and an adjustable timing mechanism to control the operation of the pump relatively to the closing of the slide whereby the cavity may be properly filled before the closing of the slide, at all operating speeds of the machine.

8. A typographic casting machine comprising a mold having cavity forming walls, one of said walls being provided with a nozzle opening, a nozzle, a mold blade, a closure slide movable transversely of said opening, a cam shaft, means operated from said shaft to reciprocate said mold blade and to open and close said slide, means operated from said shaft to introduce metal through said nozzle into said cavity, said last mentioned means including a pump and a trip device for controlling the pump, and an adjustable timing mechanism in the form of a plurality of separately adjustable plates for controlling the time of tripping the pump relatively to the time of closing the slide whereby the cavity may be properly filled before closure of the slide, at all operating speeds of the machine.

9. A typographic casting machine comprising a mold having cavity forming walls, one of said walls being provided with an inlet port, the walls of said port forming a nozzle seat, a nozzle in contact with said seat and opening in direct communication with said cavity through said port, an abutment having a thin end wall positioned in proximity to the central portion of said port and a closure member provided with a thin end wall and movable crosswise of said port into contact with said abutment whereby the meeting walls of said abutment and member constitute a cutting device for severing the molten metal issuing from the nozzle and for closing the port, thus preventing the metal in the cavity from running out.

10. A typographic mold comprising cavity-forming walls, the bottom wall thereof being provided with a nozzle opening in direct communication with said cavity, an abutment having its end positioned in proximity to the central portion of said opening, and a cutoff blade movable transversely of said opening to contact with said abutment end and close the opening, the upper surfaces of the abutment and blade being in the plane of the cavity-forming bottom wall and constituting in closed position a portion of the bottom of the mold cavity.

11. A typographic mold comprising cavity-forming walls, the bottom wall thereof being provided with a nozzle opening in direct communication with said cavity, an abutment having a thin end wall positioned in proximity to the central portion of said opening, and a cut-off blade provided with a thin end wall and movable transversely of said opening to contact said end wall with said abutment end wall, the upper surfaces of said abutment and blade being in the plane of the cavity-forming bottom wall, and the meeting end walls of said abutment and blade constituting a metal severing and mold cavity closing device, their upper surfaces when in closed position forming a portion of the bottom mold cavity wall.

12. A machine for casting type metal elements of a printing form comprising a mold having cavity-forming side and bottom walls, a movable blade the end of which forms one wall of said cavity, an inlet port being provided in said bottom wall, the walls of said port constituting a nozzle seat, a closure slide for opening and closing said port, means for introducing molten metal into the cavity including a nozzle alternately movable to seating position and to removed position, and means for operating said mold blade and said closure slide whereby the latter closes when the nozzle is in seated position.

13. A typographic mold comprising cavity-forming walls, one of said walls being provided with an inlet port, the walls of said port constituting a nozzle seat, and a member for opening and closing said port, said member being located between the nozzle seat and the cavity, and its inner surface being flush with the cavity-forming wall in which the port is provided.

14. A mold for typographic elements comprising cavity-forming walls, one of said walls being provided with an opening for the entrance of molten metal, and a closure blade movable to open and close said opening, said blade having a surface which, in closed position, forms a wall of the cavity and thus defines the form of a part of the element cast in said cavity.

15. A typographic mold comprising cavity-forming side and bottom walls, the latter provided with a port for admitting molten metal, the walls of said port forming a nozzle seat, a movable blade the end of which forms one wall of the mold cavity, and a closure member at the upper portion of said nozzle seat for opening and closing said port.

16. A typographic mold comprising a base plate provided with a metal inlet opening, a closure member slidable on said base plate to open and close said opening, the upper surface of said member being flush with the upper surface of said base plate, water-cooled side blocks, vertical devices for securing said blocks to said plate, a replaceable mold unit comprising mold-cavity forming cheek pieces, point blocks and a movable mold blade and horizontal devices for clamping said blocks and said unit together.

17. A typographic mold comprising a base plate provided with a metal inlet opening, a closure member slidable on said base plate to open and close said opening, the upper surface of said member being flush with the upper surface of said base plate, side blocks each provided with water conduits, water connections from each of said blocks whereby each block is water-cooled independently of the other, said blocks being provided with vertical holes, bolts extending through said holes and screw-threaded into said base plate whereby said blocks are secured to said plate, a replaceable mold unit comprising mold-cavity forming cheek pieces, point blocks and a movable mold blade, said blocks and unit being provided with horizontal holes, and bolts extending through said horizontal holes to clamp said blocks and said unit together.

18. A typographic mold comprising cavity-forming walls, one of said walls being provided with a nozzle opening in direct communication with said cavity, and a cut-off blade movable transversely of said opening whereby the opening may be opened or closed.

19. A typographic mold comprising cavity-forming walls, one of said walls being provided with a nozzle opening in direct communication with said cavity, a portion of the walls of said opening forming a nozzle seat and a portion of said walls between said seat and the mold cavity defining a port, and a cutoff blade movable transversely of said opening in the plane of said port to open and close the latter.

20. A typographic mold comprising a base plate provided with a nozzle opening, a mold unit positioned on said plate and embodying two type blocks, a point block and a mold blade, front and rear bolster blocks mounted on the base plate, their proximate faces contacting with the type blocks, means for clamping the bolsters together with the mold unit between them and means for securing the bolsters to the base block, the type blocks being relatively thin to afford a short path for conducting heat from the mold cavity and the bolsters comprising relatively large masses of metal each being provided with water-cooling channels therein whereby the heat from the cavity is quickly conducted to large, relatively cold masses of metal and dissipated thereby.

21. A typographic mold comprising a base plate provided with a metal inlet opening, water-cooled side blocks, vertical devices for securing said blocks to said plate, a replaceable mold unit comprising mold-cavity-forming type blocks, point blocks and a movable mold blade, and horizontal devices for clamping said unit between said blocks.

22. A typographic mold comprising a mold base, a mold unit comprising type blocks, point blocks and a mold blade combined to form a casting cavity, one of said blocks being provided with a spring tongue, side blocks and means for clamping the mold unit between the side blocks and for securing the side blocks to the base, a plunger located in an opening in one of said side blocks and contacting at its end with said tongue and means for controlling the contacting pressure thereof against the tongue.

23. A typographic mold comprising a mold base provided with a nozzle opening, gage pieces mounted on said base, a mold unit comprising type blocks, point blocks, and a mold blade combined to form a casting cavity, one of said type blocks being cut away to expose portions of the point blocks near the ends thereof whereby the mold unit may be positioned both longitudinally and crosswise on the base with its casting cavity properly above the nozzle opening by causing said exposed portions of the point blocks to contact with said gage pieces, the positioning of the mold unit being thus determined by its point blocks as gages, side blocks and means for clamping the mold unit between the side blocks and for securing the side blocks to the base.

24. A mold unit for typographic machines comprising rear and front type blocks each provided with a central cut-out portion, point blocks between said type blocks at the upper part thereof, means for securing the type and point blocks together to form a rigid structure and a mold blade movable between said type blocks and in sliding contact therewith and with one of said point blocks, the bottom walls of said cut-out portions being beveled to form on each block a matrix seat of relatively small area.

25. A mold unit for typographic machines comprising a rear type block, a front type block, a point block, means for securing said point block between said type blocks at the upper part thereof to form a rigid structure, and a mold blade movable between said type blocks below the point block, the sides of the blade contacting with the type blocks and the upper edge thereof contacting with the point block.

26. A mold unit for typographic machines comprising a rear type block, a front type block, a point block, means for securing said point block between said type blocks at the upper part thereof to form a rigid structure, one of said type blocks being provided with a spring tongue formed by a longitudinal kerf located below the point block and extending inwardly from the discharge end of the type block, and a mold blade movable between said type blocks below the point block, the sides of the blade contacting with the type blocks, and the upper edge thereof contacting with the point block.

27. A mold unit for typographic machines comprising a rear type block provided with a central cut-out portion, a front type block provided with a similar cut-out portion, point blocks secured to said type blocks at the upper part thereof and each projecting into the recess formed by said cut-out portions, a mold blade movable between and in contact with said type blocks, the upper edge of said blade being in contact with one of said point blocks.

28. A mold unit for typographic machines comprising a rear type block provided with a central cut-out portion, a front type block provided with a similar cut-out portion, point blocks secured to said type blocks at the upper part thereof and each projecting into the recess formed by said cut-out portions, a mold blade movable between and in contact with said type blocks, the upper edge of said blade being in contact with one of said point blocks, one of said type blocks being provided with a spring tongue formed by a longitudinal kerf located below one of the point blocks and extending inwardly from the discharge end of the type block.

29. A mold unit for typographic machines comprising rear and front type blocks each provided with a central cut-out portion, point blocks secured to said type blocks at the upper part thereof and each projecting into the recess formed by the said cut-out portions, one of said blocks being recessed at each end to expose the point blocks for gaging purposes, and a mold blade movable between said type blocks and in sliding contact therewith and with one of said point blocks.

30. Typographic casting mechanism comprising a mold base, a mold unit comprising type blocks, point blocks and a mold blade combined to form a casting cavity, side blocks, fastening means for clamping the mold unit between the side blocks and for securing the side blocks to the base, matrix guide blocks, each supported upon a side block, one block being positioned against said unit and the other being positioned against the first guide block to provide guide walls suitably spaced for sliding contact with the matrix, a matrix, and means for clamping said matrix, as positioned by said walls, upon said mold unit to close the casting cavity thereof.

31. Typographic casting mechanism comprising a mold base, a mold unit comprising type blocks, point blocks and a mold blade combined to form a casting cavity, side blocks, fastening means for clamping the mold unit between the side blocks and for securing the side blocks to the base, matrix guide blocks each supported upon a side block, one block being positioned against said unit and the other being positioned against the first guide block to provide guide walls suitably spaced for sliding contact with the matrix, a matrix, and means comprising a toggle-joint for clamping said matrix, as positioned by said walls, upon said mold unit to close the casting cavity thereof.

32. Typographic casting mechanism comprising a mold base, a mold unit comprising type blocks, point blocks and a mold blade combined to form a casting cavity, side blocks, fastening means for clamping the mold unit between the side blocks, and for securing the side blocks to the base, matrix guide blocks each supported upon a side block, one block being positioned against said unit and the other being positioned against the first guide block to provide guide walls suitably spaced for sliding contact with the matrix, a matrix, actuating means connected with the matrix to move it alternately from a position upon said mold unit to close the casting cavity therein, to a removed position for permitting ejection of the cast, said actuating means comprising a support, a toggle-joint connecting the matrix and the support and a means connected with the toggle-joint for operating it and thus alternately moving the matrix to removed position and forcing it to mold closing positions.

33. Typographic casting mechanism comprising mold walls forming a cavity, a matrix for closing one side of said cavity and for giving form to a portion of the cast, means for introducing molten metal into the cavity, actuating means connected with the matrix to move it alternately from mold closing position to a removed position for permitting ejection of the cast, means for causing ejection of the cast, said actuating means comprising a support, a toggle joint connecting the matrix and the support, a cam lever and means connecting said lever with the toggle-joint for operating it and thus alternately moving the matrix to removed position and forcing it to mold closing position, and a matrix guide forming a structural part of the mold and having walls in slidable contact with the side walls of the matrix to guide the latter in all positions thereof.

34. A typographic mold comprising a base plate provided with a metal inlet opening, side blocks each having its central portion cut away to form a recess, a replaceable mold unit comprising mold-cavity forming type blocks each having its central portion cut away to form a recess in alignment with said first named recess, point blocks between the type blocks and projecting into the recess formed by said type blocks and a mold blade movable between said type blocks and below one of said point blocks, a matrix guiding block adapted to be positioned in the recess of one of said side blocks and contacting with the projecting portions of said point blocks, a second matrix guiding block adapted to be positioned in the recess of the other one of said side blocks, means for securing said side blocks and matrix blocks to said base plate and means for clamping said mold unit between said side and matrix blocks, the abutting faces of said matrix blocks being cut away to provide a matrix well between them in which a matrix is adapted to be guided.

35. A typographic mold comprising a mold base provided with a nozzle opening, gage pieces mounted on said base, side blocks each having its central portion cut away to form a recess, a replaceable mold unit comprising type blocks each having its central portion cut away to form a recess in alignment with said first named recess, point blocks between the type blocks and projecting into the recess formed by said type blocks and a mold blade movable between said type blocks and below one of said point blocks, one of said type blocks being cut away to expose portions of the point blocks near the ends thereof whereby the mold unit may be positioned both longitudinally and crosswise on the base with its casting cavity properly above the nozzle opening by causing said exposed portions of the point block to contact with said gage pieces, a matrix guiding block adapted to be positioned in the recess of one of said side blocks and contacting with the projecting portions of said point blocks, a second matrix guiding block adapted to be positioned in the recess of the other one of said side blocks, and means for clamping the mold unit between the side and matrix blocks and for securing the side and matrix blocks to the base, the abutting faces of said matrix blocks being cut away to provide a matrix well between them in which a matrix is adapted to be guided, whereby the positioning of the mold unit above the nozzle opening and of the matrix guiding faces is determined by the mold unit point blocks as gages.

36. A typographic casting machine comprising a mold having cavity-forming walls, one of said walls being provided with an inlet port, pump mechanism adapted to introduce metal through said port into said cavity, a mold blade, a cam shaft, operating connections between the cam shaft and the pump mechanism, and operating connections between the cam shaft and the mold blade, the latter connections including a lever and means for adjusting the stroke of the lever, whereby the adjustment of the latter will produce a desired length of stroke for the mold blade.

37. A typographic casting machine comprising a mold having cavity-forming walls, one of said walls being provided with an inlet port, pump mechanism adapted to introduce metal through said port into said cavity, a mold blade, a cam shaft, operating connections between the cam shaft and the pump mechanism, a lever operated from said cam shaft, a lever connected with said mold blade and provided with a plurality of openings, a spring-box connecting rod between the cam lever and said mold blade lever, and micrometer adjustable stops for accurately determining the movement of the mold blade in each direction, the said openings in the said mold blade lever being provided for the adjustable connection thereto of the spring-box connecting rod, whereby undue shock against the stops in any adjustment thereof and undue compression of the spring-box spring are prevented.

38. A typographic casting machine comprising a mold having cavity-forming walls, one of said walls being provided with an inlet port, pump mechanism adapted to introduce metal through said port into said cavity, a mold blade, a cam shaft, operating connections between the cam shaft and the pump mechanism, a lever operated from said cam shaft, a lever connected with said mold blade and provided with a plurality of openings, a spring-box connecting rod between the cam lever and said mold blade lever, the said openings in the said mold blade lever being located in an arc whereby connection of the rod and the mold blade lever employing any one of said openings will produce a mold blade stroke depending upon the opening chosen but the position of the blade at one end of its stroke will be constant for all the openings.

39. A casting machine for fused or non-fused typographic material comprising a mold having cavity-forming walls, one of said walls being provided with an inlet port, pump mechanism adapted to introduce metal through said port into said cavity, a mold blade, a cam shaft, operating connections between said cam shaft and the pump mechanism, a lever operated from said cam shaft a lever connected with said mold blade and provided with two series of openings, a spring-box connecting rod between the cam lever and said mold blade lever, said rod being adapted to be connected to the mold blade lever through the intermediary of the openings of one series for producing fused material and by the aid of the other series for producing non-fused material.

40. A casting machine for fused or non-fused typographic material comprising a mold having cavity-forming walls, one of said walls being provided with an inlet port, pump mechanism adapted to introduce metal through said port into said cavity, a mold blade, a cam shaft, operating connections between said cam shaft and the pump mechanism, a lever operated from said cam shaft, a lever connected with said mold blade and provided with two series of openings, a spring-box connecting rod between the cam lever and said mold blade lever, the said openings of each series being located in an arc whereby connection of the rod and the mold blade lever by an opening of one series will determine the mold blade stroke for producing fused material and such connection by an opening of the other series will determine the mold blade stroke for non-fused material, but the position of the mold blade at one end of its stroke will be constant for all the openings of one series, and its position at one end of its stroke will be another constant for all the openings of the other series.

41. A typographic casting machine comprising a watercooled mold having cavity-forming walls, one of said walls being provided with an inlet port, the walls of said port forming a nozzle seat, a nozzle, means for moving the latter alternately from seating position, in which the nozzle is cooled by the mold, to removed position, and a nozzle shield surrounding the nozzle in all positions thereof, said shield being insulated from the mold whereby freezing of the nozzle and undue heating of the mold are prevented.

42. A typographic casting machine comprising a water-cooled mold having cavity forming walls, one of said walls being provided with an inlet port, the walls of said port forming a nozzle seat, a mold blade, means for introducing molten metal into the mold cavity, said means including a pot, a nozzle, and means for moving the latter alternately from seating position, in which position the nozzle is cooled by the mold, to removed position, in which the nozzle is heated by the molten metal of the pot, means for operating said mold blade and said nozzle moving mechanism, and a nozzle shield secured to said mold and insulated therefrom, said shield surrounding said nozzle in all positions thereof, whereby freezing of the nozzle and undue heating of the mold are prevented.

43. A typographic casting machine comprising a water-cooled mold having cavity-forming walls, one of said walls being provided with an inlet port, the walls of said port forming a nozzle seat, a nozzle, means for moving the latter alternately from seating position, in which the nozzle is cooled by the mold, to removed position, and a shield secured to and insulated from said mold and surrounding the nozzle in all positions thereof, said shield being conical in form whereby metal impinging upon the shield in the vicinity of the nozzle seat is caused to flow away from the seat along the walls of the shield.

44. In a typographic casting machine the combination of a mold comprising cavity-forming walls, one of said walls being provided with an inlet port, the walls of which port form a nozzle seat, a nozzle, and means for introducing molten metal into the cavity through the nozzle, said nozzle being provided with an axial conduit terminating at its inner end in a plurality of branches for directing the metal angularly into different parts of the mold cavity.

45. A nozzle for a typographic casting machine comprising a screwthreaded end for attachment to a pump mechanism, its opposite end being in the form of a truncated cone to seat against the nozzle seat of a typographic mold, said nozzle being provided with an axial conduit extending from said screwthreaded end into proximity to the opposite or mold end of the nozzle, and branch conduits leading angularly from the axial conduit through the mold end of the nozzle, said branch conduits being in the same axial plane.

46. In a typographic casting machine, the combination of a mold comprising cavity-forming walls, one of said walls being provided with an inlet port, the walls of which port form a nozzle seat, a nozzle, and pump mechanism for introducing molten metal into the cavity through the nozzle, the latter being provided with an axial conduit in communication with the pump and extending into proximity to the mold cavity, and a plurality of fan-shaped branch conduits connecting said axial conduit with said cavity.

47. The process of casting continuous fused strip material for printing forms in relatively long and thin sections, which consists in directing a stream of molten metal into contact with the rear wall of a previously cast section to ensure fusion and simultaneously directing another stream at an angle therefrom to insure the filling of the relatively long and thin mold cavity defining the section to be cast.

48. The process of casting continuous fused strip material for printing forms in relatively long and thin sections, which consists in flowing a plurality of streams of metal into the relatively long and thin mold cavity defining the section to be cast, one of said streams being directed to wash against the rear wall of the section previously cast and congealed, to insure fusion of the sections.

49. A typographic machine embodying mechanism for producing during each revolution of the machine either a section of a continuous fused typemetal strip or a separate non-fused typemetal element, a cutter positioned to act upon said elements as they issue from the producing mechanism, said cutter being adjustable toward and from said mechanism to operate at a non-fused joint between elements, means for operating said cutter from the machine once during each revolution of the latter, said means being manually set for operation or for rendering said cutter inoperative, a second cutter beyond the first named cutter to act upon the fused strip after it has passed through the first cutter when the latter is inoperative, said second cutter including a trip device set by the strip itself, and means for operating said second cutter from the machine only when the trip device has been thus set.

50. A typographic machine adjustable to produce either non-fused or fused elements, a stacker for the non-fused elements and a cutter for the fused elements, a vibrating lever operated by the machine, a connection between the lever and the stacker, said connection being adapted to be manually established when the machine is adjusted to produce non-fused elements to cause the stacker to operate from said lever and being adapted to be manually broken when the machine is adjusted to produce fused elements to permit said product to be ejected beyond said stacker into said cutter, a normally broken connection between said lever and said cutter and a trip device adapted to be operated by said fused product to establish said normally broken connection and cause said cutter to be operated from said lever.

51. A typographic machine provided with a cam shaft, element producing and ejecting devices, and connections for operating said devices from said shaft, and in combination therewith, two cutter-and-stacker mechanisms, a vibrating lever moved by said shaft for operating both of said cutters, one of said cutter mechanisms being tripped or set into operating condition by the element itself, and a connection between said lever and the other of said cutter mechanisms, said connection being manually established to cause the lever to operate said second named cutter or manually broken to cause the first named cutter to operate under control of the element, the second cutter being located between the first cutter and the element producing and ejecting devices to act as a guide for the element as it is ejected toward said first cutter.

52. A cutting mechanism for typographic strip material comprising a stationary frame, a cutter carriage longitudinally movable in said frame, a gage rod and gage secured to and movable with said carriage, the gage being adjustable to a desired length of cut product and being adapted to be engaged by the strip to set the rod and carriage longitudinally from zero position, said cutter carriage including a fixed blade and a transversely movable blade, means to operate the latter at any set position of the carriage, a spring to normally maintain the carriage at zero position and to return it to said position after the cutting operation, and a friction shoe between stationary and longitudinally movable parts, being secured to one of said parts and frictionally engaging the other, to prevent rebounding of the carriage from zero position after return thereto by the spring and thus to ensure cutting of the strip accurately in the desired lengths.

53. A cutting mechanism for typographic strip material comprising a stationary frame, a cutter carriage including a fixed cutter blade and a transversely movable cutter blade provided with a shoulder and depression, a gage rod and gage secured to said carriage, the gage being adapted to be engaged by the strip material to set the carriage longitudinally in said frame, a spring to return the said carriage to zero position after the cutting operation, a vibrating lever, a pawl pivoted thereto and provided with an extension and with a finger contacting with the top of said carriage when in zero position, a spring to cause said pawl extension to engage during the forward movement of the lever with said cutter blade shoulder when the carriage has been moved and set longitudinally out of contact with said finger, thus operating said movable blade transversely to cut the strip, a spring for retracting said blade, and a cam surface on said shoulder depression for raising the pawl during the return movement of the lever and thus raising the finger out of the path of the return movement of the carriage under action of its return spring.

54. A typographic machine including a mold, a mold blade for dimensioning the casting cavity and ejecting the cast element partly from the mold thus causing said element to move preceding elements outside of and away from the mold, and means for adjusting the position of the end of said blade at the completion of its forward stroke, and in combination therewith a stacker mechanism comprising a vibrating pusher blade movable in a crosswise direction to displace laterally one of said elements outside of the mold, means driven from the machine for vibrating said pusher, and means for adjusting said pusher toward and from the mold to position the rear end of the pusher a multiple of element lengths from the position of the end of the mold blade at the completion of its forward stroke, whereby the pusher will operate on a single element without disturbing the succeeding element.

55. In a typographical machine, a table and means for producing typographic elements and feeding them in series over the table, and in combination therewith a stacking device secured to said table and adjustable lengthwise of the elements, said device including a block, a fixed blade secured to said block and adjustable relatively thereto crosswise of the elements, a movable blade slidable crosswise to form a shear with the fixed blade, and means for reciprocating said movable blade, whereby said stacking device may be positioned to cause its movable blade to advance one end of each element in a crosswise direction.

56. In a typographic machine, a table and means for producing typographic elements and feeding them in series over the table, and in combination therewith a stacking device comprising fixed and movable blades, said device being adjustable lengthwise of the elements, whereby said device may be positioned to cause its movable blade to advance the rear end of each element in a crosswise direction, means for reciprocating said movable blade, a galley wall extending over the table crosswise of the element and having an end portion extending at right angles to said wall, means for adjusting said galley wall both crosswise and lengthwise whereby an element fed between the blades will move in front of said end portion, a spring finger on said wall in proximity to said end portion and in position to be engaged by the forward end of said element, whereby when the movable blade has advanced the rear end of said element crosswise, said finger engaging with the forward end thereof will hold said element against the fixed blade, the element being thus supported when the movable blade is retracted.

57. A stacking mechanism for typographic elements comprising a table, a block adjustably secured to said table, a fixed blade or abutment secured to said block and adjustable relatively thereto, a movable blade or pusher slidable with respect to said fixed blade and means for reciprocating said movable blade in any position of adjustment of said block.

58. A stacking mechanism for typographic elements comprising a table, a fixed blade or abutment, a movable blade or pusher associated therewith, means for vibrating the fixed blade, a galley wall extending over the table, means for adjusting said wall to a position substantially one element length from said fixed blade, said wall being provided with a spring finger whereby the movable blade is adapted to advance the element on the table to a position in which it is retained by the finger and the fixed blade during the retraction of the movable blade.

MAURITZ C. INDAHL.